United States Patent
Loos et al.

(10) Patent No.: US 12,253,396 B2
(45) Date of Patent: Mar. 18, 2025

(54) ULTRASONIC FLOW METER FLOW CONTROL

(71) Applicant: Woodward, Inc., Fort Collins, CO (US)

(72) Inventors: Jordan Loren Loos, Rockford, IL (US); Gregory Warren Pulley, Loveland, CO (US); Andrew Douglas Splitt, Loves Park, IL (US); Brian Lynn Swope, Janesville, WI (US)

(73) Assignee: Woodward, Inc., Fort Collins, CO (US)

( * ) Notice: Subject to any disclaimer, the term of this patent is extended or adjusted under 35 U.S.C. 154(b) by 82 days.

(21) Appl. No.: 17/396,329

(22) Filed: Aug. 6, 2021

(65) Prior Publication Data

US 2022/0042836 A1 Feb. 10, 2022

Related U.S. Application Data

(60) Provisional application No. 63/162,163, filed on Mar. 17, 2021, provisional application No. 63/062,681, filed on Aug. 7, 2020.

(51) Int. Cl.
  *G01F 1/66* (2022.01)
  *G01F 1/667* (2022.01)
  *G01F 5/00* (2006.01)

(52) U.S. Cl.
  CPC .............. *G01F 1/662* (2013.01); *G01F 1/667* (2013.01); *G01F 5/00* (2013.01)

(58) Field of Classification Search
  CPC ............. G01F 1/662; G01F 1/667; G01F 5/00
  See application file for complete search history.

(56) References Cited

U.S. PATENT DOCUMENTS

| | | |
|---|---|---|
| 3,218,852 A | 11/1965 | Scarpa et al. |
| 3,575,050 A | 4/1971 | Lynnworth |

(Continued)

FOREIGN PATENT DOCUMENTS

| | | |
|---|---|---|
| CN | 205642485 | 10/2016 |
| DE | 3116333 | 11/1982 |

(Continued)

OTHER PUBLICATIONS

Machine translation of EP0249689A1 (Year: 1987).*

(Continued)

*Primary Examiner* — David M Schindler
*Assistant Examiner* — Sangkyung Lee
(74) *Attorney, Agent, or Firm* — Fish & Richardson P.C.

(57) ABSTRACT

The subject matter of this specification can be embodied in, among other things, a fluid flow conditioning apparatus that includes a linear fluid conduit configured to define a linear fluid flow path, a fluid inlet defining an inlet fluid flow path that is non-parallel to the linear fluid flow path, a first fluid flow conditioner having a first conditioner configured to receive fluid flow along the inlet fluid flow path, condition fluid flow, and redirect conditioned fluid flow away from the inlet fluid flow path along the linear fluid flow path along the major axis, a second fluid flow conditioner configured to receive fluid flow from the linear fluid flow path along the major axis, redirect fluid flow away from the linear fluid flow path along an outlet fluid flow path that is non-parallel to the linear fluid flow path, and condition fluid flow, and a fluid outlet.

16 Claims, 19 Drawing Sheets

(56) References Cited

U.S. PATENT DOCUMENTS

| | | | |
|---|---|---|---|
| 3,925,692 | A | 12/1975 | Leschek et al. |
| 4,157,482 | A | 6/1979 | Kakinuma |
| 4,297,608 | A | 10/1981 | Jensen |
| 4,308,745 | A | 1/1982 | Lisitsa et al. |
| 4,320,659 | A | 3/1982 | Lawrence et al. |
| 4,345,657 | A | 8/1982 | Mig |
| 4,754,645 | A | 7/1988 | Piche et al. |
| 5,464,039 | A | 11/1995 | Bergamini |
| 5,750,892 | A | 5/1998 | Huang |
| 6,005,395 | A | 12/1999 | Chan et al. |
| 6,651,484 | B2 | 11/2003 | Fiebelkorn et al. |
| 7,051,765 | B1 | 5/2006 | Kelley et al. |
| 7,464,611 | B2 | 12/2008 | Matter |
| 7,600,417 | B2 | 10/2009 | Paradise |
| 7,954,387 | B1 | 6/2011 | Furlong et al. |
| 8,181,536 | B2 | 5/2012 | Augenstein et al. |
| 8,584,531 | B2 | 11/2013 | Liao et al. |
| 8,756,990 | B2 | 6/2014 | Speldrich |
| 8,950,436 | B2 * | 2/2015 | Chalupa ............... F15D 1/0015 138/40 |
| 8,959,913 | B2 * | 2/2015 | Nagurney ............... F02B 37/02 123/562 |
| 9,057,391 | B2 | 6/2015 | Sawchuk et al. |
| 9,182,259 | B2 | 11/2015 | Suzuki |
| 9,187,974 | B2 | 11/2015 | Coonrod et al. |
| 9,239,337 | B2 | 1/2016 | Mueller |
| 9,261,389 | B2 | 2/2016 | Gill |
| 9,267,833 | B2 | 2/2016 | Ohmiya |
| 9,297,680 | B2 | 3/2016 | Maruyama et al. |
| 9,605,695 | B2 | 3/2017 | Sawchuk et al. |
| 9,702,855 | B2 | 7/2017 | Han et al. |
| 9,759,591 | B2 * | 9/2017 | Pearson ............... G01P 5/245 |
| 9,891,085 | B2 | 2/2018 | Muhammad et al. |
| 10,126,762 | B2 * | 11/2018 | Loos ............... G05D 7/0126 |
| 10,208,555 | B2 | 2/2019 | Gottlieb et al. |
| 10,309,432 | B2 | 6/2019 | Reckner et al. |
| 11,307,069 | B2 | 4/2022 | Loos |
| 11,650,087 | B2 | 5/2023 | Davey et al. |
| 11,668,818 | B2 | 6/2023 | Loos et al. |
| 2002/0195246 | A1 | 12/2002 | Davidson |
| 2004/0007079 | A1 | 1/2004 | Wilda |
| 2004/0093957 | A1 | 5/2004 | Buess |
| 2004/0123672 | A1 * | 7/2004 | Wang ............... G01F 1/6847 73/861.21 |
| 2005/0016281 | A1 | 1/2005 | Hill et al. |
| 2005/0189108 | A1 | 9/2005 | Davidson |
| 2007/0125826 | A1 | 7/2007 | Shelton, IV |
| 2007/0227263 | A1 | 10/2007 | Fukano |
| 2007/0233412 | A1 | 10/2007 | Gotoh |
| 2008/0294144 | A1 | 11/2008 | Leo et al. |
| 2010/0050455 | A1 | 3/2010 | Siraky |
| 2010/0192703 | A1 | 8/2010 | Huang et al. |
| 2011/0022335 | A1 | 1/2011 | Foucault et al. |
| 2011/0042938 | A1 | 2/2011 | Gallagher et al. |
| 2011/0271769 | A1 | 11/2011 | Kippersund et al. |
| 2012/0073687 | A1 * | 3/2012 | Hanson ............... B29C 48/49 137/625.17 |
| 2012/0188842 | A1 | 6/2012 | Smith |
| 2012/0247223 | A1 | 10/2012 | Sawchuk et al. |
| 2012/0312522 | A1 | 12/2012 | Quin et al. |
| 2013/0205892 | A1 | 8/2013 | Ueda |
| 2014/0086017 | A1 | 3/2014 | Nakano et al. |
| 2014/0138567 | A1 | 5/2014 | Coull |
| 2014/0198822 | A1 | 7/2014 | Lei et al. |
| 2014/0260513 | A1 | 9/2014 | Smirnov et al. |
| 2014/0260667 | A1 | 9/2014 | Berkcan |
| 2014/0311253 | A1 | 10/2014 | Iwasa |
| 2015/0013472 | A1 | 1/2015 | Gill et al. |
| 2015/0082913 | A1 | 3/2015 | Maruyama et al. |
| 2015/0160053 | A1 | 6/2015 | Baumoel |
| 2016/0061629 | A1 | 3/2016 | Han et al. |
| 2016/0258798 | A1 | 9/2016 | Muhammad et al. |
| 2017/0102364 | A1 | 4/2017 | Hill et al. |
| 2017/0350741 | A1 | 12/2017 | Marshall |
| 2018/0051973 | A1 | 2/2018 | Schrubbe |
| 2018/0058202 | A1 | 3/2018 | Disko et al. |
| 2018/0058209 | A1 | 3/2018 | Song et al. |
| 2018/0306625 | A1 | 10/2018 | Baker |
| 2019/0154026 | A1 | 5/2019 | Kamen et al. |
| 2019/0250022 | A1 | 8/2019 | Gagne et al. |
| 2020/0041375 | A1 | 2/2020 | Bowdle |
| 2020/0103263 | A1 | 4/2020 | Ploss et al. |
| 2020/0173569 | A1 * | 6/2020 | Koch ............... F16K 15/1848 |
| 2021/0164816 | A1 | 6/2021 | Loos |
| 2021/0278262 | A1 | 9/2021 | Loos |
| 2022/0034695 | A1 | 2/2022 | Loos |
| 2022/0042835 | A1 | 2/2022 | Loos |
| 2022/0043142 | A1 | 2/2022 | Loos |
| 2022/0214452 | A1 | 7/2022 | Pulley et al. |
| 2022/0299349 | A1 | 9/2022 | Loos et al. |
| 2022/0323995 | A1 | 10/2022 | Gyde et al. |
| 2023/0066926 | A1 | 3/2023 | Loos et al. |
| 2024/0085229 | A1 | 3/2024 | Loos et al. |

FOREIGN PATENT DOCUMENTS

| | | | |
|---|---|---|---|
| DE | 19710296 | | 3/1998 |
| DE | 29916826 | | 11/2000 |
| DE | 102013224819 | | 6/2015 |
| DE | 102014205042 | | 9/2015 |
| DE | 102016105338 | | 9/2017 |
| DE | 202017007116 | | 8/2019 |
| EP | 0249689 | A1 * | 12/1987 |
| EP | 0451355 | | 10/1991 |
| EP | 0907069 | | 4/1999 |
| EP | 1188935 | | 3/2002 |
| EP | 1279368 | | 1/2003 |
| EP | 0890826 | B1 * | 11/2009 |
| EP | 2232342 | | 9/2010 |
| EP | 2824429 | | 1/2015 |
| EP | 2827111 | | 1/2015 |
| EP | 3222980 | | 9/2017 |
| GB | 2259571 | | 3/1993 |
| GB | 2321705 | | 8/1998 |
| GB | 2336681 | | 10/1999 |
| JP | 2006337059 | | 12/2006 |
| JP | 2010261872 | | 11/2010 |
| WO | WO9205042 | | 4/1992 |
| WO | WO 2004010087 | | 1/2004 |
| WO | WO-2005040732 | A1 * | 5/2005 ............... G01F 1/44 |
| WO | WO2009071746 | | 6/2009 |
| WO | WO2016033534 | | 3/2016 |
| WO | WO-2020157707 | A1 * | 8/2020 ............ A61M 16/00 |
| WO | WO2021040540 | | 3/2021 |
| WO | WO2021113444 | | 6/2021 |

OTHER PUBLICATIONS

Machine translation of EP0890826B1 (Year: 2009).*
PCT International Search Report and Written Opinion in International Appln. No. PCT/US2021/045040, dated Nov. 16, 2021, 15 pages.
PCT International Search Report and Written Opinion in International Appln. No. PCT/US2021/045049, dated Nov. 16, 2021, 6 pages.
PCT Invitation to Pay Additional Fees, and, Where Applicable, Protest Fee in International Appln. No. PCT/US2021/045047, dated Nov. 19, 2021, 14 pages.
Puttmer et al., "Ultrasonic Density Sensor for Liquids", IEEE Transactions on Ultrasonics, Ferroelectrics, and Frequency Control, Jan. 2000, 47(1):85-92.
Hoche et al., "Ultrasound-Based Density Determination via Buffer Rod Techniques", J. Sens. Syst., 2013, 2:103-125.
Kazys et al., "Ultrasonic Technique for Density Measurement of Liquids in Extreme Conditions", Sensors, 2015, 15:19393-19415.
Nakamura, "Ultrasonic Transducers: Materials and Design for Sensors, Actuators and Medical Applications", Woodhead Publishing, 2012.
PCT International Search Report and Written Opinion in International Appln. No. PCT/US2020/063013, dated May 11, 2021, 21 pages.

(56) References Cited

OTHER PUBLICATIONS

PCT International Search Report and Written Opinion in International Appln. No. PCT/US2021/021103, dated Jun. 16, 2021, 14 pages.
PCT Invitation to Pay Additional Fees, and, Where Applicable, Protest Fee in International Appln. No. PCT/US2020/063013, dated Mar. 19, 2021, 16 pages.
PCT International Preliminary Report on Patentability in International Appln. No. PCT/US2020/063013, dated Feb. 21, 2022, 28 pages.
PCT International Search Report and Written Opinion in International Appln. No. PCT/US2021/045042, dated Nov. 19, 2021, 6 pages.
Flowconditioner.com [online], "Flow Conditioners," Canada Pipeline Accessories, Jun. 2021, retrieved on Dec. 14, 2022, retrieved from URL <https://www.flowconditioner.com/flow-conditioner/>, 6 pages.
NASA.gov [online], "Balanced Flow Meters without Moving Parts," NASA Technical Reports Server, Jan. 2008, retrieved on Dec. 14, 2022, retrieved from URL <https://ntrs.nasa.gov/citations/20090020619>, 2 pages.
NASA.gov [online], "NASA Tech Briefs, Jan. 2008," NASA Technical Reports Server, Jan. 2008, retrieved on Dec. 14, 2022, retrieved from URL <https://ntrs.nasa.gov/archive/nasa/casi.ntrs.nasa.gov/20090020593.pdf>, 43 pages.
No Author Listed, "ASME PTC 19.5-2004—Flow Measurement—Performance Test Codes," The American Society of Mechanical Engineers, Jul. 2005, 184 pages.
PIProcessinstrumentation.com [online], "Improving flow measurement accuracy with flow conditioners," Jan. 12, 2017, retrieved on Dec. 14, 2022, retrieved from URL <https://www.piprocessinstrumentation.com/home/article/15563560/improving-flow-measurement-accuracy-with-flow-conditioners>, 11 pages.
Sanderson et al., "Guidelines for the Use of Ultrasonic Non-Invasive Metering Techniques," Flow Measurement and Instrumentation, 2002, 13(4):125-142.
Stoof et al., "Contributing to Economic Upstream Gas Metering with a Dual-Path Ultrasonic Flow Metering Solution," SICK AG, Oct. 2018, 20 pages.

Wateronline.com [online], "QCT Series In-Line Ultrasonic Flow Meters for Low Viscosity Liquid Applications," Jun. 2021, retrieved on Dec. 14, 2022, retrieved from URL <https://www.wateronline.com/doc/qct-series-in-line-ultrasonic-flow-meters-for-low-viscosity-liquid-applications-0001>, 1 page.
European Search Report in European Application No. EP 23151677.4, dated Apr. 3, 2023, 7 pages.
PCT International Search Report and Written Opinion in International Appln. No. PCT/US2022/075579, mailed on Dec. 23, 2022, 15 pages.
International Preliminary Report on Patentability in International Application No. PCT/US2021/045040, mailed on Feb. 16, 2023, 9 pages.
International Preliminary Report on Patentability in International Application No. PCT/US2021/045042, mailed on Feb. 16, 2023, 10 pages.
International Preliminary Report on Patentability in International Application No. PCT/US2021/045049, mailed on Feb. 16, 2023, 10 pages.
International Search Report and Written Opinion in International Appln. No. PCT/US2023/016039, mailed on Jul. 3, 2023, 15 pages.
Communication Pursuant to Article 94(3) EPC in European Patent Application No. 21714749.5, dated Sep. 21, 2023, 7 pages.
PCT International Preliminary Report on Patentability in International Appln. No. PCT/US2021/045047, dated Sep. 28, 2023, 13 pages.
Communication Pursuant to Article 94(3) EPC in European Patent Application No. 23151677.4, dated Mar. 19, 2024, 5 pages.
International Preliminary Report on Patentability in International Application No. PCT/US2022/075579, mailed on Mar. 7, 2024, 8 pages.
Communication Pursuant to Article 94(3) EPC in European Patent Application No. 21714749.5, dated Apr. 26, 2024, 6 pages.
International Preliminary Report on Patentability in International Application No. PCT/US2023/016039, mailed on Oct. 10, 2024, 9 page.
PCT International Search Report and Written Opinion in International Appln. No. PCT/US2021/045047, dated Mar. 1, 2022, 21 pages.

* cited by examiner

ULTRASONIC FLOW METER FLOW CONTROL

CROSS-REFERENCE TO RELATED PATENT APPLICATIONS

This application claims the benefit of priority to U.S. Provisional Application No. 63/062,681, filed Aug. 7, 2020, and U.S. Provisional Application No. 63/162,163, filed Mar. 17, 2021, the contents of which are incorporated by reference herein.

TECHNICAL FIELD

This instant specification relates to ultrasonic fluid mass flow sensors.

BACKGROUND

Fluid measurement devices are used for the characterization and operation of fluid control systems. As the dynamic bandwidths, flow ranges, accuracies, and reliabilities of flow measurement devices improve, the potential application landscape of such devices broadens. High dynamic bandwidth flow meters can be used as control system feedback sensors for improving steady state and/or transient accuracy in fuel systems. Ultrasonic flow meters (USFM) are a proven industrial technology that can be leveraged for implementation to aircraft turbine systems.

Existing time of flight ultrasonic flow meters are used in the racing and automotive industries, pipeline custody transfer, industrial flow measurement, and many other applications. However, many of these applications encompass steady-state flow conditions, and their respective applications allow for volumetric flow measurement. In other applications, such as aircraft gas turbine engine applications, the fluid environmental conditions of the fuel delivery system imposes significant design challenges.

In the art of fuel flow meters (primary element) flow conditioning of fuel is necessary for controllability of the fuel flow entering and leaving the meter to achieve desired flow meter performance, accuracy, and adequate turn down ratios. As a general rule of thumb of fluid dynamics, for a given diameter of pipe it can take 10 or more lengths of straight pipe following a disturbance for a fluid flow to stabilize (e.g., a length-to-diameter, L/D, ratio of about 10 or greater).

SUMMARY

In general, this document describes ultrasonic fluid mass flow sensors.

In an example embodiment, a fluid flow conditioning apparatus includes a linear fluid conduit having a first tubular body defining a major axis and extending from a conduit inlet to a conduit outlet arranged opposite the conduit inlet, and configured with a predetermined flow geometry to define a linear fluid flow path along the major axis, a fluid inlet defining an inlet fluid flow path that is non-parallel to the linear fluid flow path, a first fluid flow conditioner having a first conditioner inlet in fluidic communication with the fluid inlet, and a first conditioner outlet in fluidic communication with the conduit inlet, and configured to receive fluid flow through the first conditioner inlet along the inlet fluid flow path, condition, by the first conditioner inlet, fluid flow, and redirect conditioned fluid flow away from the inlet fluid flow path and through the first conditioner outlet along the linear fluid flow path along the major axis, a second fluid flow conditioner having a second conditioner inlet in fluidic communication with the conduit outlet, and a second conditioner outlet, and configured to receive fluid flow from the linear fluid flow path along the major axis, redirect fluid flow away from the linear fluid flow path and through the second conditioner outlet along an outlet fluid flow path that is non-parallel to the linear fluid flow path, and condition, by the second conditioner outlet, fluid flow, and a fluid outlet configured to receive fluid flow from the second conditioner outlet.

Various embodiments can include some, all, or none of the following features. The first fluid flow conditioner can include a second tubular body extending between a first longitudinal end and a second longitudinal end opposite the first longitudinal end, wherein the first conditioner inlet is arranged along the second tubular body, and the second longitudinal end defines the first conditioner outlet. The first conditioner inlet can include a collection of ports defined radially through the second tubular body. The fluid flow conditioning apparatus can include a sensor apparatus arranged proximal to the first longitudinal end. The fluid flow conditioning apparatus can include a sensor apparatus arranged proximal to the second longitudinal end. The second fluid flow conditioner can include a tubularly convergent portion having a predefined geometry proximal the conduit outlet and configured to partly restrict fluid flow along the linear fluid flow path. The second fluid flow conditioner can include a tubularly divergent portion having a predefined geometry proximal the conduit outlet and configured to partly expand fluid flow along the linear fluid flow path. The second fluid flow conditioner can include a second tubular body extending between a first longitudinal end and a second longitudinal end opposite the first longitudinal end, wherein the second conditioner outlet is arranged circumferentially about the second tubular body, and the first longitudinal end defines the second conditioner inlet, and the second longitudinal end has an impingement surface configured to redirect impinging fluid flow along the major axis radially away from the linear fluid flow path and toward the second conditioner outlet. Impinging fluid flow can impinge in a first direction along the major axis, and redirecting impinging fluid flow includes redirecting impinging fluid flow in a second direction at least partly opposite the first direction. The second conditioner outlet can have a first flowable cross-sectional area perpendicular to the outlet fluid flow path, and the fluid outlet can include a first outlet end proximal the second conditioner outlet and having a second flowable cross-sectional area, smaller than the first flowable cross-sectional area, perpendicular to the outlet fluid flow path, a second outlet end opposite the first outlet end, and a tapered tubular conduit portion defining a cavity having the first flowable cross-sectional area proximal the first outlet end and tapering to the second flowable cross-sectional area proximal the second outlet end.

In an example implementation, a method of fluid flow conditioning includes receiving a fluid flow, flowing along a first fluid flow path, conditioning the fluid flow by flowing the fluid flow through a first conditioner inlet of a first fluid flow conditioner, redirecting, by the first fluid flow conditioner, the fluid flow away from the first fluid flow path and toward a linear fluid flow path, flowing the fluid flow along the linear fluid flow path through a first conditioner outlet, flowing the fluid flow along the linear fluid flow path through a fluid conduit having a first tubular body extending from a conduit inlet to a conduit outlet arranged opposite the conduit inlet, and configured with a predetermined flow geometry, flowing the fluid flow through a second conditioner inlet of a second fluid flow conditioner along the linear fluid flow path, redirecting, by the second fluid flow conditioner, the fluid flow away from the linear fluid flow path and toward a second fluid flow path, and conditioning the fluid flow by flowing the fluid flow through a second conditioner outlet of the second fluid flow conditioner.

Various implementations can include some, all, or none of the following features. The method can include transmitting an ultrasonic signal through the first conditioner outlet, the fluid conduit, and the second conditioner inlet along the linear fluid flow path, receiving the ultrasonic signal through the second conditioner inlet, and determining at least one of a mass flow rate and a volume flow rate of the fluid flow based on the received ultrasonic signal. The first fluid flow conditioner can include a second tubular body extending between a first longitudinal end and a second longitudinal end opposite the first longitudinal end, wherein the first conditioner inlet is arranged along the second tubular body, and the second longitudinal end defines the first conditioner outlet. The first conditioner inlet can include a collection of ports defined radially through the second tubular body, and conditioning the fluid flow by flowing the fluid flow through a first conditioner inlet of a first fluid flow conditioner also includes flowing the fluid flow through the collection of ports. The method can include at least one of transmitting and receiving, by an ultrasonic transducer, an ultrasonic signal through the first conditioner outlet and the fluid conduit along the linear fluid flow path, wherein the first fluid flow conditioner includes the ultrasonic transducer arranged proximal to the first longitudinal end. The method can include partly restricting, by a tubularly convergent portion of the second fluid flow conditioner having a predefined geometry proximal the conduit outlet, fluid flow along the linear fluid flow path. The method can include partly expanding, by a tubularly divergent portion of the second fluid flow conditioner having a predefined geometry proximal the conduit outlet, fluid flow along the linear fluid flow path. Redirecting, by the second fluid flow conditioner, the fluid flow away from the linear fluid flow path and toward a second fluid flow path can include flowing the fluid flow through a first longitudinal end of the second fluid flow conditioner, wherein the second fluid flow conditioner can include a second tubular body extending between the first longitudinal end defining the second conditioner inlet and a second longitudinal end opposite the first longitudinal end, impinging fluid flow along a major axis of the fluid conduit upon an impingement surface of the second longitudinal end, and redirecting the impinging fluid flow radially away from the linear fluid flow path and toward a second conditioner outlet arranged circumferentially about the second tubular body. The impinging fluid flow can impinge in a first direction along the major axis, and redirecting the impinging fluid flow can include redirecting the impinging fluid flow in a second direction at least partly opposite the first direction. The method can also include at least one of transmitting and receiving, by an ultrasonic transducer, an ultrasonic signal through the second conditioner outlet and the fluid conduit along the linear fluid flow path, wherein the second fluid flow conditioner includes the ultrasonic transducer arranged proximal to the second longitudinal end. The method can include flowing the fluid flow from the second conditioner outlet of the second fluid flow conditioner along the second fluid flow path through a fluid outlet, wherein the second conditioner outlet has a first flowable cross-sectional area perpendicular to the second fluid flow path, and the fluid outlet includes a first outlet end proximal the second conditioner outlet and having a second flowable cross-sectional area, smaller than the first flowable cross-sectional area, perpendicular to the second fluid flow path, a second outlet end opposite the first outlet end, and a tapered tubular conduit portion defining a cavity having the first flowable cross-sectional area proximal the first outlet end and tapering to the second flowable cross-sectional area proximal the second outlet end.

The systems and techniques described here may provide one or more of the following advantages. First, a system can provide improved environmental survivability against wide fluid temperature ranges. Second, the system can provide improved environmental survivability against wide fluid pressure ranges. Third, the system can provide improved environmental survivability against harsh fluids. Fourth, the system can provide integral fluid density sensing. Fifth, the system can be relatively unaffected by fluid flow dynamics (e.g., swirl, vortices, instability). Sixth, the system can be used with update rates of 100 Hz or greater, while maintaining accuracy. Seventh, the system can provide increased flow meter accuracy. Eighth, the system can provide improved sensor reliability.

The details of one or more implementations are set forth in the accompanying drawings and the description below. Other features and advantages will be apparent from the description and drawings, and from the claims.

DETAILED DESCRIPTION

Figure 1:
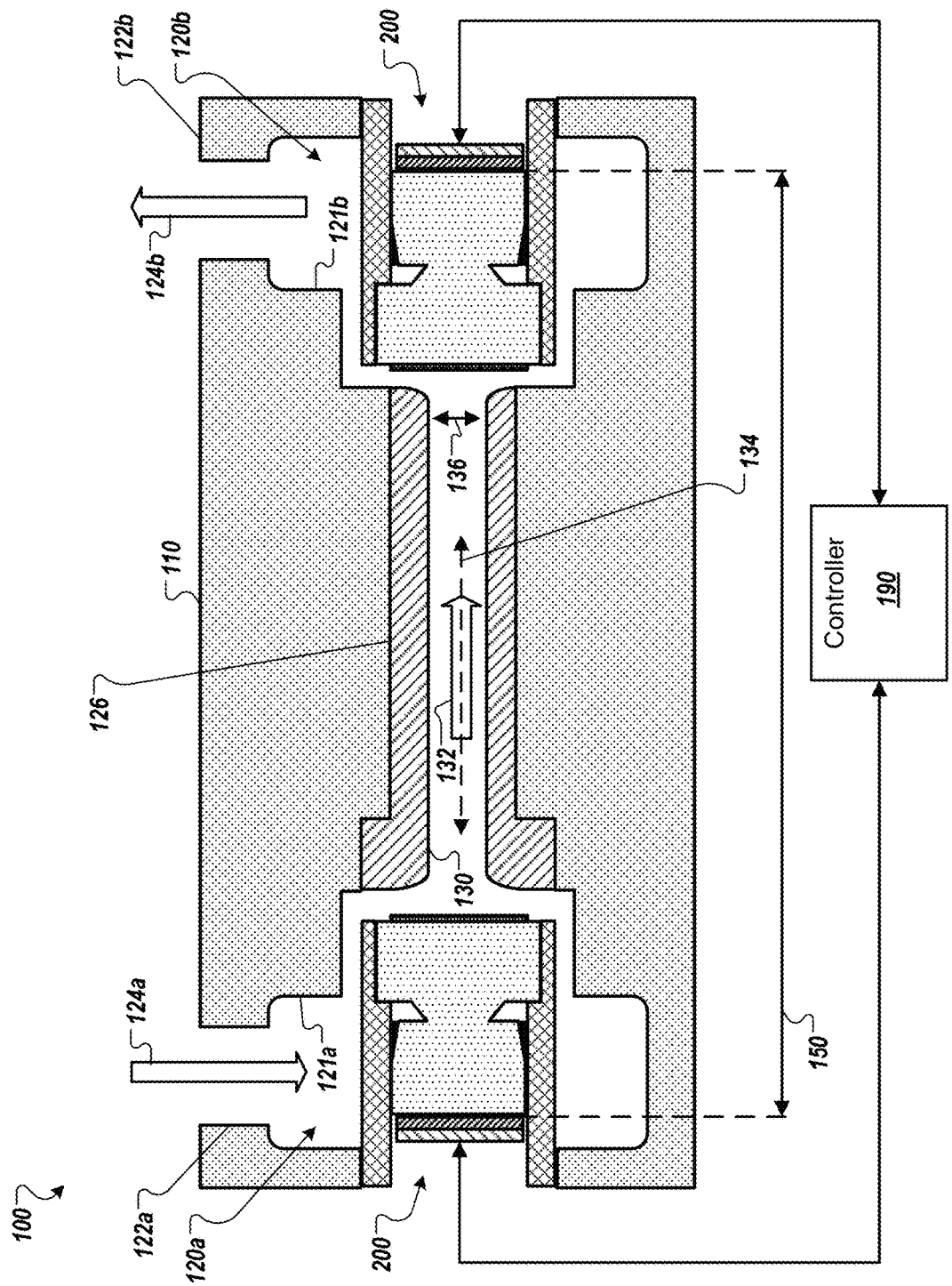
FIG. 1 is a cross-sectional diagram of an example ultrasonic flow measurement system.

This document describes ultrasonic fluid mass flow sensor (USFM) systems, and techniques for measuring fluid flow characteristics of fluids. In general, the USFM systems described in this system can be used in fluid environments that would degrade or destroy existing USFM systems. The fluid environmental conditions of fuel delivery systems can impose significant design challenges. For current, state of the art, aircraft and other gas turbine engine applications, an ultrasound transducer deployed for such applications will be expected to survive high fluid pressures (e.g., 0 psi to 4000 psi or higher) and a wide range of fluid temperatures, including high fluid temperatures (e.g., −65 degrees F. or lower to 325 degrees F. or higher).

These temperatures and pressures are far more challenging than the pressures and temperatures that are typically encountered in industrial fluid, steam, or pipeline custody transfer applications. To remain effective in such applications, a wetted transducer must also not be degraded by long-term immersion in caustic fluids such as aircraft fuels and/or additives at high temperatures and/or pressures. The USFM systems described in this document include features that improve the survivability of the USFM under such conditions.

In existing industrial and custody transfer USFM systems based on time of flight, cross-correlation, and phase shift measurements have accuracy limitations determined by the flow velocity range, or turn-down ratio, within the flow measurement volume. For example, during low flow conditions the difference between upstream and downstream measurements can be too insensitive to maintain a target accuracy. During high flow conditions, measurement accuracy can suffer from flow instabilities, often caused by the acoustic path being off-axis with respect to the flow, flow separation, and/or non-axisymmetric flow conditions. Off-axis transducer configurations can also cause sensitivity and accuracy problems. Round transducers can impose non-uniform ultrasound fields as the waves pass diagonally through the flow, reducing accuracy. In existing USFM systems having ultrasound beams smaller than the flow cross-section, the full flow profile is not insonified and therefore must be estimated, typically with a single K-factor correction value, or a complex coefficient matrix for USFM systems using multiple sonic paths, such as in natural gas custody transfer applications. In existing USFM designs, flow measurement accuracy can be difficult to maintain over a large turndown ratio when the flow regime is unstable, or changes substantially from laminar to turbulent flow. For example, some existing industrial USFM systems have a practical turndown ratio of no more than 50:1 while maintaining accuracy, even when application piping and flow conditioning are executed ideally. By comparison, a gas turbine fuel system can require a substantially higher turndown of generally 100:1, with some applications upward of 350:1 or more. In addition, a gas turbine flow measurement system must be capable of maintaining dynamic accuracy, with update rates of 100 Hz or more.

Mass flow is critical to the combustion process to maintain a safe and operable fuel to air ratio. Excess fuel to air ratio can lead to compressor surge or over temperature events. Conversely, excess air to fuel can lead to compressor blow out. Either of these events can be detrimental to gas turbine performance and are therefore key design drivers for gas turbine engine design. Additionally, some applications such as gas turbine engines are designed to operate on various fuel types under varying pressures and temperatures.

An important variable, especially in aircraft gas turbine applications, is the variation in fuel specific gravity amidst the fuel types and temperatures. In some applications, the expected fuel specific gravity can vary by approximately 25% across expected temperature ranges and useable fuel types. The wide range in fuel density, if unknown, will drive a broad range in mass fuel flow for a given volumetric flow rate. This variability can lead to large variances in mass air to fuel flow ratios, making engine design across the environmental range inefficient, yielding oversized engines, conservative acceleration and/or deceleration schedules, excessive surge margins, and/or excessive blowout margins.

FIG. 1 is a cross-sectional diagram of an example of an ultrasonic flow measurement (USFM) system 100. The USFM system 100 includes a fluid housing 110 and two ultrasonic sensor modules 200. The fluid housing 110 includes an axial fluid housing cavity 120a defined by an interior surface 121a, and an axial fluid housing cavity 120b defined by an interior surface 121b. A fluid port 122a defines a fluid path 124a connected to the fluid cavity 120a. A fluid port 122b defines a fluid path 124b connected to the fluid cavity 120b. The fluid housing 110 also defines a cavity 126 that extends between the fluid cavity 120a and the 120b.

The fluid housing 110 also includes a fluid control conduit 130 that defines a fluid path 132 along a conduit axis 134. The fluid control conduit 130 fluidically connects the fluid cavity 120a and the fluid cavity 120b, putting the fluid cavity 120a in fluidic communication with the fluid cavity 120b. The fluid control conduit 130 has a predetermined flowable area 136 and shape (e.g., square, tapered, and/or curved edges, parallel or tapered walls, to affect fluid flow behavior). In some implementations, the fluid housing 110 can be used across many applications, and the fluid control conduit 130 can be an interchangeable, specialized subcomponent (e.g., an adapter) that can adapt the USFM system 100 for particular fluid types, applications, and/or operational conditions.

Figure 2A:
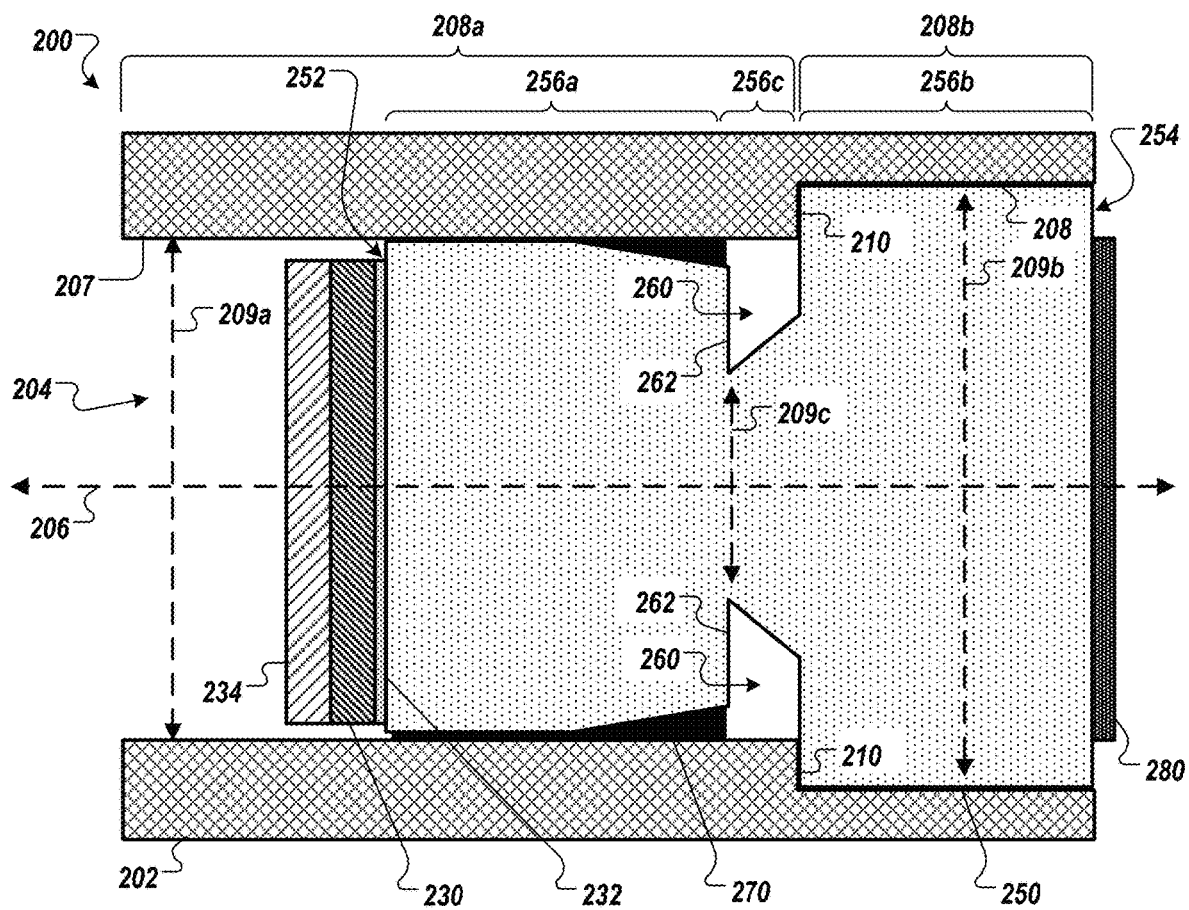
FIG. 2A is a cross-sectional diagram of an example ultrasonic sensor module of the system of FIG. 1.

Referring now to FIG. 2A, an enlarged cross-sectional diagram of the example ultrasonic sensor module 200 of the system of FIG. 1 is shown. The ultrasonic sensor module 200 includes a sensor housing 202 having an axial interior sensor housing cavity 204 and a sensor axis 206 defined by an interior surface 207. When the ultrasonic sensor module 200 is assembled to the fluid housing 110 of FIG. 1, the sensor axis 206 is substantially aligned with the conduit axis 134. The sensor housing 202 has an axial sensor housing portion 208a having a cross-sectional area 209a perpendicular to the sensor axis 206. The sensor housing 202 also has an axial sensor housing portion 208b having a cross-sectional area 209b perpendicular to the sensor axis 206. The cross-sectional area 209b is dimensionally larger than the cross-sectional area 209a. A face 210 extends from the interior surface 207 of the axial sensor housing portion 208a to an interior surface 208 of the axial sensor housing portion 208b. In the illustrated example, the face 210 is formed as a substantially squared shoulder or ledge at the transition between the cross-sectional area 209a and the cross-sectional area 209b. In some embodiments, the face 210 can be a tapered or otherwise non-squared transition between the cross-sectional area 209a and the cross-sectional area 209b.

The ultrasonic sensor module 200 also includes an acoustic transceiver element 230. The acoustic transceiver element 230 is configured to emit acoustic vibrations (e.g., ultrasonic sounds waves) at a predetermined wavelength (λ) when energized. In some embodiments, a separate acoustic driver and acoustic receiver may be implemented as the acoustic transceiver element 230. In some embodiments, the acoustic transceiver element 230 can be configured to detect received acoustic vibrations also. In some embodiments, the acoustic transceiver element 230 can be a piezo element.

The acoustic transceiver element 230 is acoustically mated with or otherwise abutted to an axial end 252 of a buffer rod 250 by a bonding layer 232. In some embodiments, the bonding layer 232 can be an adhesive layer. In some embodiments, the buffer rod can be made of any appropriate material or combination of materials that can provide proper acoustic impedance ratios when combined with matching layer material to improve or maximize sensitivity of measurements, are cost effective, can be fabricated within reasonable manufacturing tolerances, and/or provide good mechanical and chemical compatibility in the intended application environment. Examples of buffer rod materials include titanium alloys, austenitic stainless steel, aluminum, borosilicate glasses, fused (e.g., non-crystalline) quartz, and technical ceramics (e.g., AlN, $Al_2O_3$, SiN, and blends).

In some embodiments, the bonding layer 232 can be omitted, with the acoustic transceiver element 230 in direct contact with the axial end 252. For example, the acoustic transceiver element 230 can be held in place by a mechanical clamp or other appropriate fixation assembly, or the acoustic transceiver element 230 can be held in place by fixation features formed in the interior surface 207. In some embodiments, the bonding layer 232 can be formed from a highly ductile material, such as gold or lead, which can be conformed to the mating faces of the acoustic transceiver element 230 and the axial end 252.

The acoustic transceiver element 230 is backed by a backing 234. The backing 234 has a predetermined form and is made of a material that improves the sensitivity and/or efficiency of the acoustic transceiver element 230.

The buffer rod 250 extends along the sensor axis 206 from the axial end 252 to an axial end 254 opposite the axial end 252. The buffer rod 250 has a predetermined axial length of about a round multiple of one-half of the transmission wavelength of the acoustic transceiver element 230 (n/2λ).

The buffer rod 250 includes an axial buffer portion 256a arranged within the axial sensor housing portion 208a and includes the axial end 252. The buffer rod 250 includes an axial buffer portion 256b arranged within the axial sensor housing portion 208b and includes the axial end 254. In some embodiments, the axial buffer portion 256b can contact the interior surface directly or indirectly (e.g., through a seal, sleeve, or bonding material) to substantially seal the sensor cavity 204 from fluid incursion at the axial end 254.

Figure 2B:
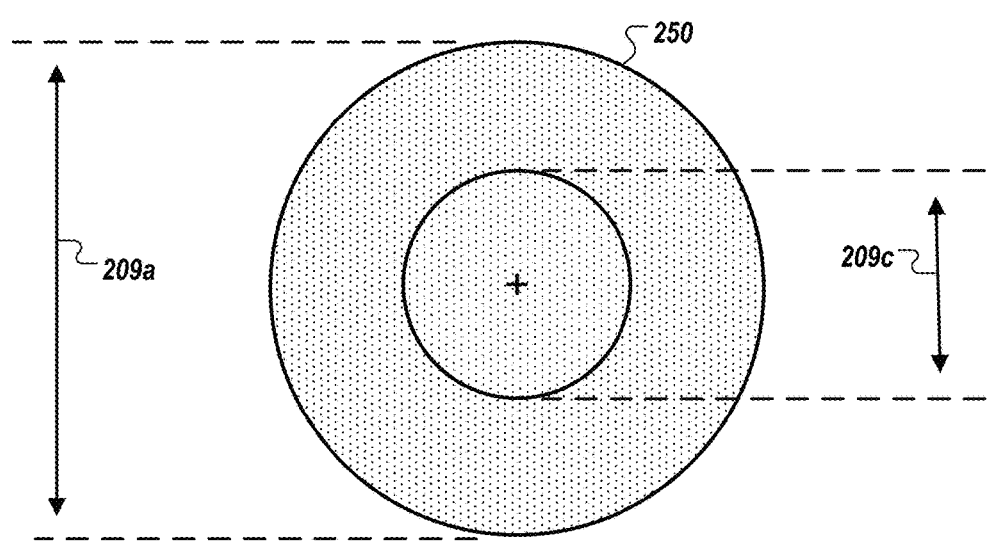
FIG. 2B shows a conceptual example of reflective surface areas in the example ultrasonic sensor module of FIG. 2A.

The buffer rod 250 also includes an axial buffer portion 256c that extends axially between the axial buffer portion 256a and the axial buffer portion 256b. The axial buffer portion 256c has a cross-sectional area 209c that is smaller than the cross-sectional area 209a perpendicular to the sensor axis 206. A cavity 260 is defined between the interior surface 207 and the axial buffer portion 256c. The cavity 260 is partly defined by a face 262 defined between the axial buffer portion 256a and the axial buffer portion 256c. The face 262 is a predetermined distance from the axial end 252. Referring to FIG. 2B, the cross-sectional area 209a is about twice as large as the cross-sectional area 209c. In other words, the area within axial buffer portion 256c is about the same as the area of the face 262.

The buffer rod 250 has a predetermined acoustic impedance ($Z_{buffer}$). In the illustrated example, the cavity 260 is filled with air (e.g., an air gap), a fluid (e.g., oil), or a solid having an acoustic impedance that is sufficiently different from the acoustic impedance of the buffer rod 250 to reflect an acoustic echo when struck by an acoustic wave (e.g., an ultrasonic ping). In some embodiments, the cavity 260 is evacuated to form at least a partial vacuum.

In the illustrated example, the axial buffer portion 256a is partly tapered, and is covered by a cladding 270. The taper has a predetermined shape that is configured to improve the efficiency and/or sensitivity of the ultrasonic sensor module 200 by directing the propagation of incident waves. The cladding 270 is configured to improve the efficiency and/or sensitivity of the ultrasonic sensor module 200 by directing the propagation of incident waves, acoustically isolating the buffer rod 250 from the sensor housing 202, and/or thermally insulating the buffer rod 250 from the sensor housing 202. In some embodiments, the taper, the cladding, or both may be omitted. In some embodiments, other portions of the buffer rod 250 may include a cladding.

Referring again to FIG. 2A, the ultrasonic sensor module 200 includes a matching layer 280 acoustically mated with, affixed to, or otherwise abutted to the axial end 252 of the buffer rod 250. In some embodiments, the matching layer 280 may be adhered to the axial end 252. In some embodiments, portions of the matching layer 280 may extend to the sensor housing 202 and be affixed (e.g., welded) to the sensor housing 202. In some embodiments in which the matching layer 280 is affixed to the sensor housing 202, the joint between the matching layer 280 and the sensor housing 202 can substantially seal the sensor cavity 204 from fluid incursion at the axial end 254. The matching layer 280 has an axial thickness that is about a round odd multiple of the transmission wavelength of the acoustic transceiver element 230 (n/4λ), for example ¼λ.

Referring again to FIG. 1, the two ultrasonic sensor modules 200 face each other across the fluid control conduit 130. The acoustic transducer elements of the ultrasonic sensor modules 200 are separated by a predetermined distance 150.

The USFM system 100 includes a controller 190. The controller 190 includes circuitry configured to activate the ultrasonic sensor modules 200 to cause acoustic incident waves to be emitted, to detect the reception of acoustic waves at the ultrasonic sensor modules 200, measure the timings between transmission and reception of various combinations of direct and reflected acoustic waves, and/or determine various properties of the USFM system 100 and/or the fluid based in part on those measured timings as will be discussed further in the descriptions of FIGS. 3-9.

In use, a fluid is flowed through the USFM system 100. For example, a fluid such as fuel can be provided at the fluid port 122a where it will flow along the fluid path 124a into the fluid cavity 120a. The fluid flows around the ultrasonic sensor module 200 to the fluid control conduit 130. The fluid flows through the fluid control conduit 130 along the fluid path 132 and then flows around the ultrasonic sensor module 200 to the fluid cavity 120b. The fluid then flows along the fluid path 124b out the fluid port 122b. As will be discussed further in the descriptions of FIGS. 3-9, the ultrasonic sensor modules 200 are protected from direct exposure to the fluid, and are used to transmit acoustic waves through the fluid to determine properties of the fluid, such as acoustic impedance, volume flow, and mass flow.

Figure 3:
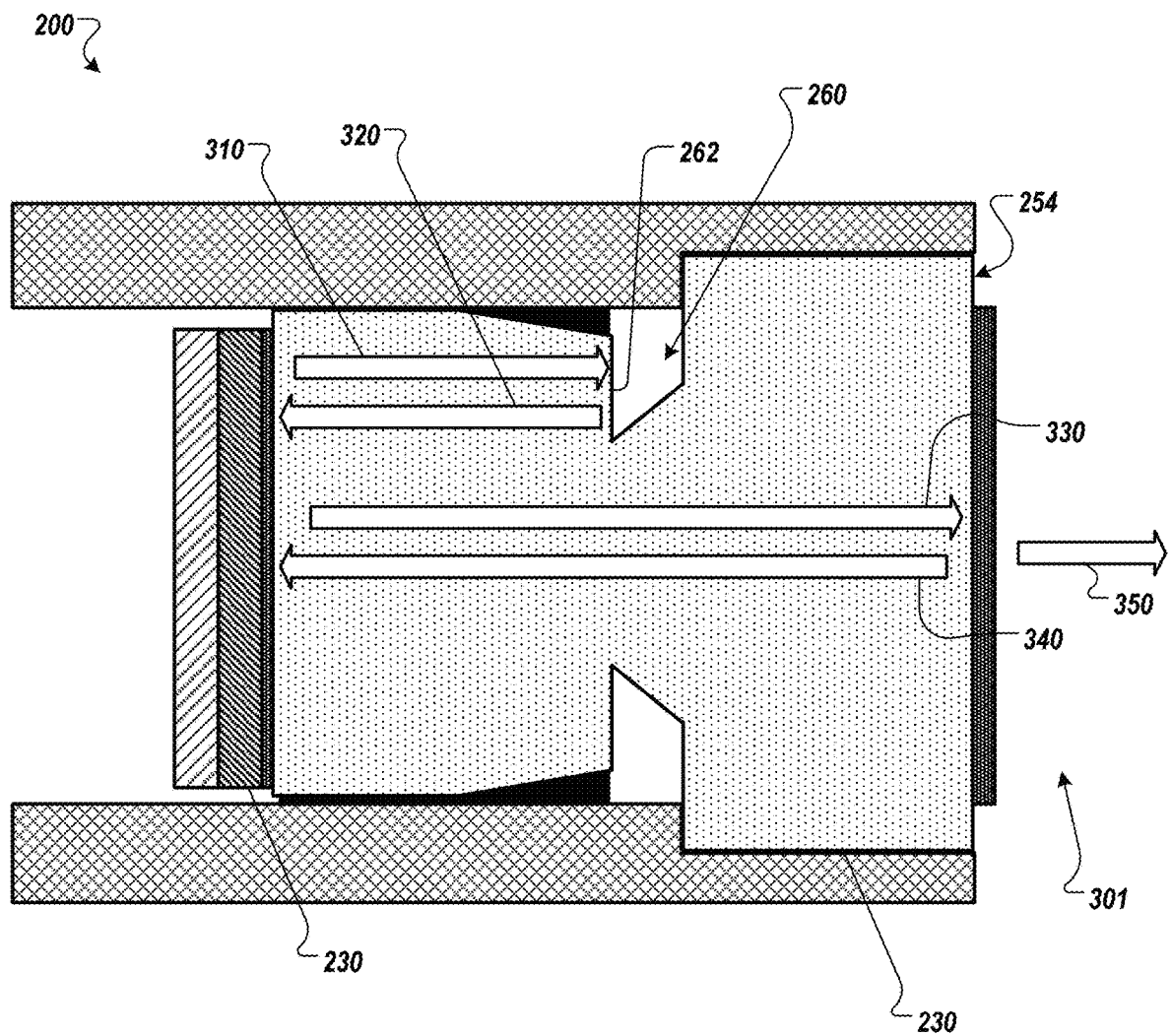
FIG. 3 shows a conceptual example of incident wave propagation in the module of FIG. 2A.

FIG. 3 shows a conceptual example of incident wave propagation in the ultrasonic sensor module 200 of FIG. 2A. In use, the acoustic transceiver element 230 is activated to emit an incident wave (e.g., a ping). The incident wave is transmitted into and along the buffer rod 250. A portion of the incident wave, represented by arrow 310, travels until it encounters the face 262. The junction of the face 262 and the cavity 260 causes a portion of the incident wave 310 to be reflected as an echo represented by arrow 320. The echo 320 travels back to be detected by the acoustic transceiver element 230. In some embodiments, the ultrasonic sensor module 200 may include a separate acoustic emitter and receiver for transmission and detection of the incident waves.

Another portion of the incident wave, represented by arrow 330, travels until it encounters the axial end 254. The junction of the axial end and a fluid 301 at the axial end 254 causes a portion of the incident wave 330 to be reflected as an echo represented by arrow 340. The echo 340 travels back to be detected by the acoustic transceiver element 230. Another portion of the incident wave, represented by arrow 350, propagates into the fluid 301 at the axial end 254.

The time between the transmission of the incident wave and detection of the echo 320 is measured (e.g., by the example controller 190 of FIG. 1) to determine a first time of flight. The time between the transmission of the incident wave and detection of the echo 340 is measured to determine a second time of flight. The amplitudes of the echo 320 and the echo 340 are also measured. As will be discussed further in the descriptions of FIGS. 6A-7, the measured times-of-flight, the measured echo amplitudes, and predetermined information about the acoustic impedance of the buffer rod 250 and predetermined distances between the acoustic transceiver element 230, the face 262, and the axial end 254, can be used to determine properties of the fluid 301 at the axial end 254, such as acoustic impedance ($Z_{fluid}$) and/or speed of sound in the fluid ($C_{fluid}$).

In some implementations, the ultrasonic sensor module 200 can be used in applications other than the USFM system 100. For example, the ultrasonic sensor module 200 can be put into contact with a fluid (e.g., attached to or submerged in a tank, pipe, or other fluid vessel or volume) and can be sonified as part of a process to determine an acoustic impedance of the fluid, a speed of sound in the fluid, and/or a fluid density of the fluid.

In some implementations, characteristics of the buffer rod 250 itself can be determined based on the measured times-of-flight and/or the measured echo amplitudes (e.g., to calibrate for unknown buffer rod acoustic impedance and/or compensate for the effects of temperature changes on the ultrasonic sensor module 200). Similarly, in some implementations, the distances between the acoustic transceiver element 230 and one or both of the face 262 and/or the axial end 254 can be determined based on the measured times of flight, the measured echo amplitudes, known distances, known buffer rod acoustic impedance, and/or known buffer rod temperature.

Figure 4:
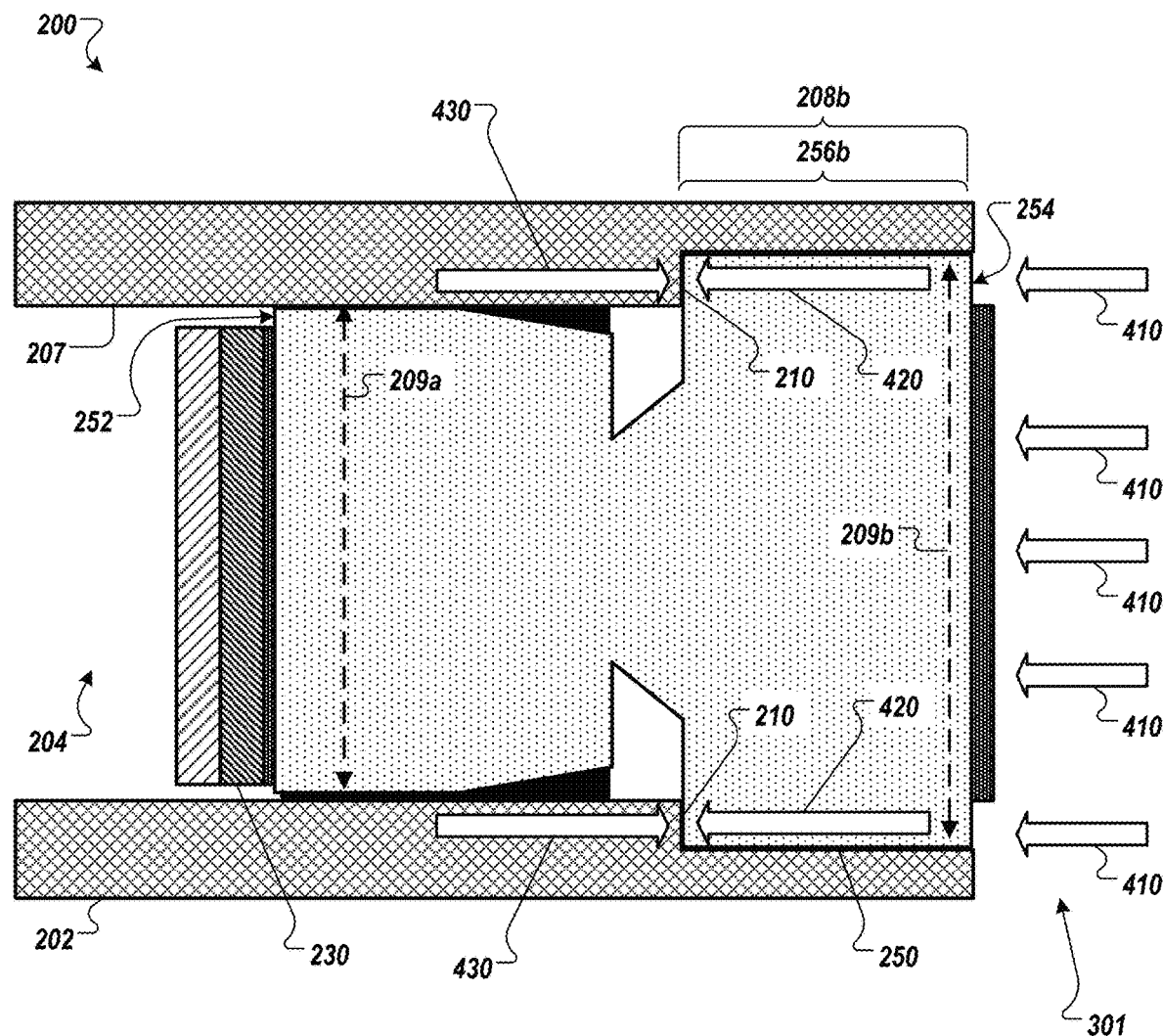
FIG. 4 shows a conceptual example of fluid pressure mitigation in the module of FIG. 2A.

FIG. 4 shows a conceptual example of fluid pressure mitigation in the ultrasonic sensor module 200 of FIG. 2A. In use, the ultrasonic sensor module 200 is at least partly exposed to the fluid 301 at the axial end 254. In some embodiments, the temperature or chemical properties of the fluid 301 can be damaging to the acoustic transceiver element 230, therefore the ultrasonic sensor module 200 is configured to prevent the fluid 301 from coming into direct contact with the acoustic transceiver element 230. For example, direct or indirect (e.g., though a shim, sleeve, cladding, seal, or sealant) contact between the axial buffer portion 256b and the axial sensor housing portion 208b and/or between the buffer rod 250 and the face 210 can substantially block fluid flow from the axial end 254 to the acoustic transceiver element 230. In some implementations, fluid seepage that gets by the buffer rod 250 can be directed to the sensor cavity 204 without contacting a major face of the acoustic transceiver element 230.

In use, the ultrasonic sensor module 200 is at least partly exposed to fluid pressure, represented by arrows 410, at the axial end 254. The fluid pressure 410 is a static fluid pressure relative to the dynamic pressures caused by the acoustic signals used by the acoustic transceiver element 230. In some embodiments, direct or indirect (e.g., through the buffer rod 250) application of the fluid pressure 410 could create a compressive force against the acoustic transceiver element 230 that could offset or otherwise negatively affect signals provided by the acoustic transceiver element 230 in response to sensed acoustic signals. In some implementations, such effects can be compensated for by mathematically or by electrically offsetting the sensor signals in order to recover an approximation of the true signal.

The ultrasonic sensor module 200 is configured to prevent the fluid pressure 410 from affecting the acoustic transceiver element 230. For example, the acoustic transceiver element 230 is acoustically mated to the axial end 252. As such, the acoustic transceiver element 230 is able to "float" on the buffer rod 250 relative to the sensor housing 202 and not become compressed by the fluid pressure 410.

The acoustic transceiver element 230 is also protected from the fluid pressure 410 by the mechanical configuration of the buffer rod 250 and the sensor housing 202. Fluid pressure 410 is applied to the axial end 254, which urges movement of the buffer rod 250 into the sensor cavity 204. This pressure that urges such movement is represented by arrows 420. Movement of the buffer rod 250 is prevented by contact between the axial buffer portion 256b and the face 210 of the sensor housing 202, as represented by arrows 430. As such, the force 420 is prevented from reaching the acoustic transceiver element 230.

The smaller size of the cross-sectional area 209a is sized to accommodate acoustic transceiver element 230 and decouple thermal expansion of the sensor housing 202 from the acoustic path. The larger size of the cross-sectional area 209b is sized to accommodate the pressure-induced forces acting on the buffer rod 250. The transmission of forces into the sensor housing 202 substantially eliminates pressure-induced forces from acting on the acoustic transceiver element 230, substantially eliminating the need for pressure compensation, transducer components that are sized to react pressure-induced forces, and/or wetted transducer design constraints.

By decoupling the acoustic transceiver element 230 from the fluid pressure environment, several advantages are observed. For example, fluid/fuel compatibility of the acoustic transceiver element 230 is not required. In another example, the acoustic transceiver element 230 frequency is not restricted by thickness requirements driven by pressure-induced forces. In another example in which the acoustic transceiver element 230 is a piezo transducer, the piezo thickness required to support fluid pressure puts the operating frequency of the acoustic transceiver element 230 far below operating requirements of time of flight measurement. In yet another example, the operational frequency of the acoustic transceiver element 230 can be sized to improve acoustic optimization and/or low flow measurement accuracy.

Figure 5A:
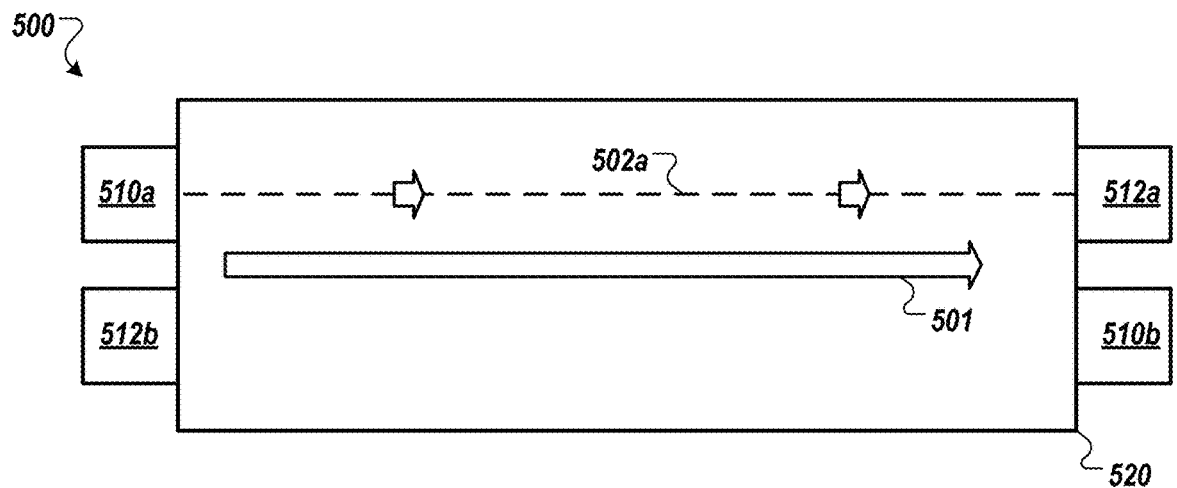
FIGS. 5A-5C show conceptual examples of incident wave traversal in an ultrasonic flow measurement system.
Figure 5B:
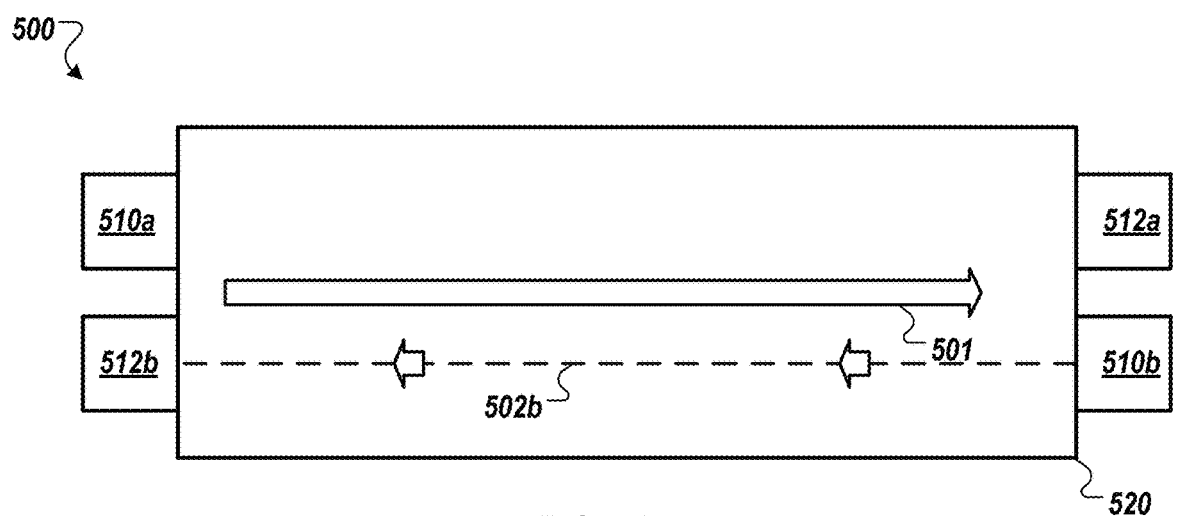
Figure 5C:
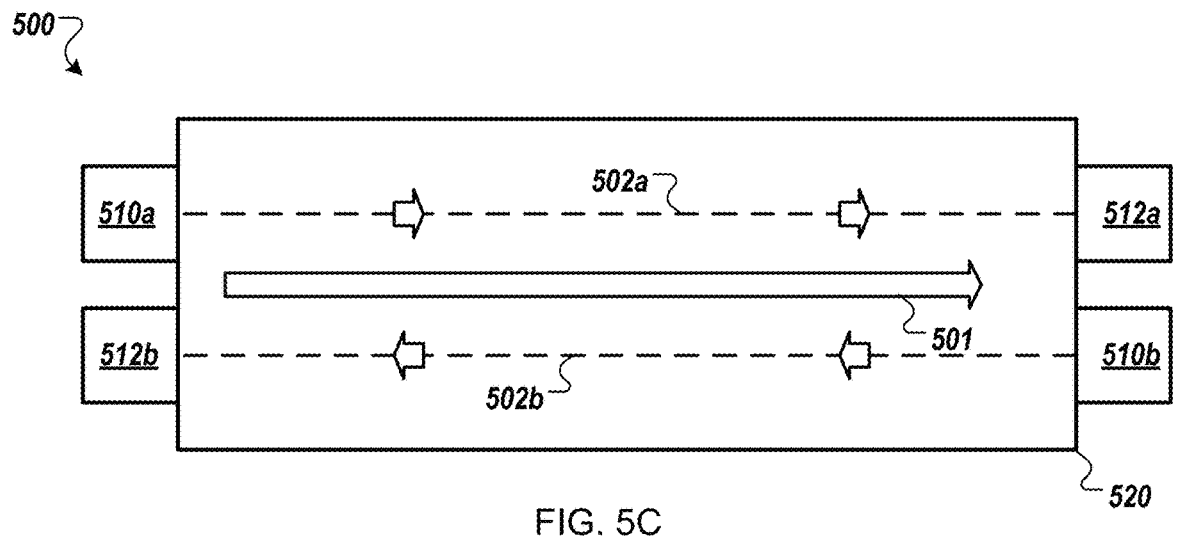

FIGS. 5A-5C show conceptual examples of incident wave traversal in an ultrasonic flow measurement system 500. In some implementations, the USFM system 500 can be an example of the USFM system 100 of FIG. 1. The USFM system 500 includes two acoustic emitters 510a and 510b, two acoustic receivers 512a and -512b, and a fluid control conduit 520. A fluid flows along the fluid control conduit 520 in a direction represented by arrow 501.

The derivation that follows assumes that the acoustic receivers 512a and 512b are aligned with their respective acoustic emitters 510a and 510b, perpendicular to the major axis of the fluid control conduit 520. Therefore, the below derivation omits angles of incidence. If the acoustic emitters 510a, 510b and acoustic receivers 512a, 512b were placed off axis, the following derivation could be re-derived using an angle of incidence. However, for simplicity, the trigonometry used to compensate for such angles is not used here.

Referring to FIG. 5A, first, the speed of sound traveling through a non-moving fluid is considered:

Distance = Velocity × time

Or:

Length(L) = Speed of sound in fluid ($C_{fluid}$) × time(t)

$$\therefore L_1 = C_{fluid} \times t_1$$

$$t_1 = \frac{L_1}{C_{fluid}}$$

Where Cfuel is the speed of sound in fluid, $L_1$ is the distance between the acoustic transmitter 510a and the acoustic receiver 512a, and $t_1$ is the signal transit time between the acoustic transmitter 510a and the acoustic receiver 512a.

Assuming that the direction 501 in which the control volume (fluid) is moving is the same as a direction of sound travel, represented by line 502a from the acoustic transmitter 510a to the acoustic receiver 512a, the speed of the sound wave traveling through the fluid will change relative to the speed of the fluid.

$$\therefore L_2 = V_2 \times t_2$$

$$V_2 = V_{fluid} + C_{fluid}$$

$$\therefore L_2 = (V_{fluid} + C_{fluid})t_2$$

$$t_2 = \frac{L_2}{(C_{fluid} + V_{fluid})}$$

Where $V_{fluid}$ is the average velocity of moving fluid, $L_2$ is the distance between the acoustic transmitter 510a and the acoustic receiver 512a, and $t_2$ is the signal transit time between the acoustic transmitter 510a and the acoustic receiver 512a.

Referring now to FIG. 5B, it is assumed that the control volume (fluid) is opposing the direction of the sound travel from the acoustic emitter 510b to the acoustic receiver 512b, represented by line 502b. The speed of the sound wave traveling through the fluid will change relative to the speed of the fluid.

$$\therefore L_3 = V_3 \times t_3$$

$$V_3 = V_{fluid} + C_{fluid}$$

$$\therefore L_3 = (-V_{fluid} + C_{fluid})t_3$$

$$t_3 = \frac{L_3}{(C_{fluid} - V_{fluid})}$$

Where $L_3$ is the distance between the acoustic emitter 510b and the acoustic receiver 512b, and $t_3$ is the signal transit time between the acoustic emitter 510b and the acoustic receiver 512b.

Referring for FIG. 5C, for a particular set of ultrasonic sensors, the devices can both emit and receive signals. This means that for a pair of signals, the following characteristics are shared:

$L_{up} = L_{down} = L$ = distance between emitters;

D = diameter Area of the fluid control conduit 520;

A = cross section area;

$C_{fluid}$ = speed of sound in fluid;

$V_{fluid}$ = velocity of fluid;

$\rho_{fluid}$ = density of fluid;

$Z_{fluid}$ = Acoustic impedance of fluid.

With the above properties shared, the difference in time between the upstream and downstream signal will allow calculation of various fluid characteristics.

Upstream and downstream transit times become:

$$t_{up} = \frac{L_{up}}{(C_{fluid} - V_{fluid})}$$

$$t_{down} = \frac{L_{down}}{(C_{fluid} + V_{fluid})}$$

Solving for $t_{up}$, $t_{down}$, and $C_{fluid}$:

$$C_{fluid} = \frac{(L_{down} - t_{down}V_{fluid})}{t_{down}}$$

$$C_{fluid} = \frac{(L_{up} + t_{up}V_{fluid})}{t_{up}}$$

Since speed of sound is common between the transducers, the speeds of sound are equal to one another and allows fluid velocity to be found:

$$C_{fluid} = C_{fluid}$$

$$\frac{(L_{down} - t_{down}V_{fluid})}{t_{down}} = \frac{(L_{up} + t_{up}V_{fluid})}{t_{up}}$$

$$L_{down}t_{up} - t_{down}t_{up}V_{fluid} = L_{up}t_{down} + t_{up}t_{down}V_{fluid}$$

$$L_{down}t_{up} - L_{up}t_{down} = t_{up}t_{down}V_{fluid} + t_{down}t_{up}V_{fluid}$$

$$L_{up} = L_{down}$$

$$L(t_{up} - t_{dn}) = 2V_{fluid}t_{up}t_{down}$$

$$V_{fluid} = \frac{L(t_{up} - t_{down})}{2t_{up}t_{down}}$$

Knowing the velocity of the fluid allows the volume fluid flow ($Q_{fluid}$) to be determined, where $C_d$ is a predetermined discharge coefficient of the fluid in the fluid control conduit 520:

$$Q_{fluid} = C_d \times A \times V_{fluid}$$

Fluid sound speed properties can also be determined. Since the fluid velocity is shared between the pair of transducers the fluid velocity can be solved. Recalling that:

$$t_{up} = \frac{L_{up}}{(C_{fluid} - V_{fluid})}$$

And:

$$t_{down} = \frac{L_{down}}{(C_{fluid} + V_{fluid})}$$

Solving $t_{up}$ and $t_{down}$ for $V_{fluid}$:

$$V_{fluid} = \frac{(L_{down} - t_{down}C_{fluid})}{t_{down}}$$

$$V_{fluid} = \frac{(-L_{up} + t_{up}C_{fluid})}{t_{up}}$$

Since velocity of the fluid is common between the transducers, the previous two equations equal one another and allow fluid sound speed to be solved:

$$V_{fluid} = V_{fluid}$$

$$\frac{(L_{down} - t_{down}C_{fluid})}{t_{down}} = \frac{(-L_{up} + t_{up}C_{fluid})}{t_{up}}$$

$$L_{down}t_{up} - t_{down}t_{up}C_{fluid} = -L_{up}t_{down} + t_{up}t_{down}C_{fluid}$$

$$L_{down}t_{up} + L_{up}t_{down} = t_{up}t_{down}C_{fluid} + t_{down}t_{up}C_{fluid}$$

$$L_{up} = L_{down}$$

$$L(t_{up} + t_{down}) = -2C_{fluid}t_{up}t_{down}$$

$$C_{fluid} = \frac{L(t_{up} + t_{down})}{2t_{up}t_{down}}$$

Figure 6A:
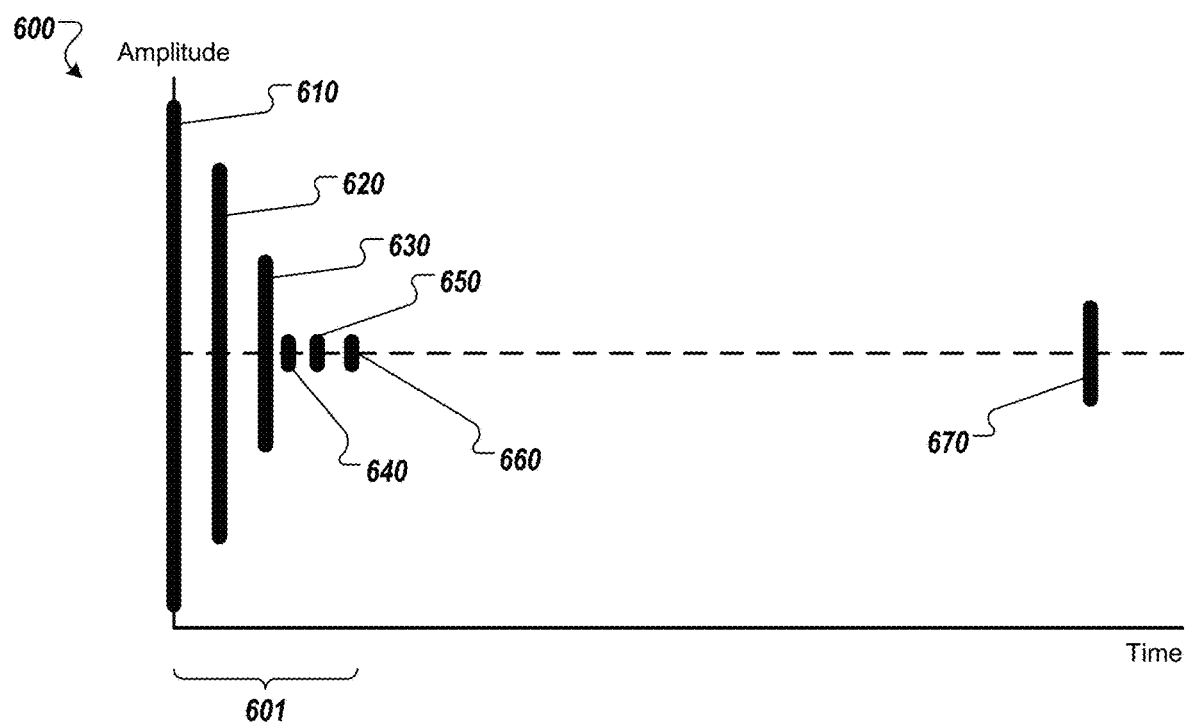
FIGS. 6A and 6B are graphs that show example incident waves and echoes in the ultrasonic flow measurement system of FIG. 1.
Figure 6B:
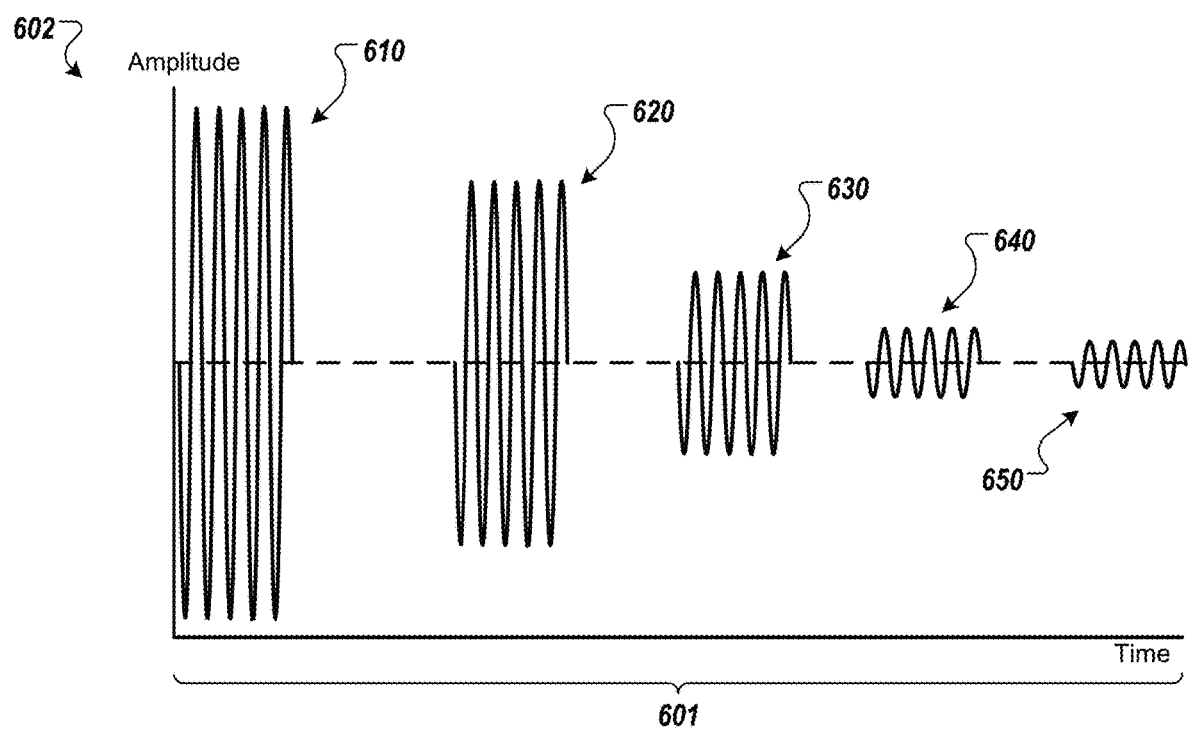

FIGS. 6A and 6B are graphs that show example incident waves and echoes in the ultrasonic flow measurement system of FIG. 1. FIG. 6A shows a graph 600 of acoustic amplitude over time, including a sub-duration 601. FIG. 6B shows a graph 602 in which the sub-duration 601 has been expanded for visibility.

The graph 600 shows a representation of the emission of an initial incident wave 610 (e.g., when the acoustic transceiver element 230 is activated to send an acoustic "ping"). An echo 620 is received a few milliseconds later. In some implementations, the echo 620 can be the echo 320 of FIG. 3, which is a reflection of a portion of the incident wave 310 off the face 262 of the cavity 260.

An echo 630 is received a few milliseconds later. In some implementations, the echo 630 can be the echo 340, which is a reflection of a portion of the incident wave 330 off the axial end 254, which is also an interface to the fluid. Echoes 640, 650, and 660 represent reverberations in the buffer rod 250. In operation, the echoes 640-660 can be filtered out or otherwise ignored.

An incident wave 670 represents a portion of the incident wave that is received by an acoustic sensor (e.g., the acoustic transceiver element 230 located downstream or otherwise opposite the acoustic transceiver element 230 that transmitted the incident wave). The amount of time taken by the incident wave 670 to arrive is affected by several variables, such as the fluid density, flow rate, and flow direction of the fluid in the fluid control conduit 130, and the distance 150. The amount of time taken for the incident wave 670 can be used as $t_{up}$ or $t_{down}$ (e.g., depending on whether the wave travelled upstream or downstream in the fluid control conduit 130).

As illustrated in FIG. 4, the buffer rod 250 is designed to transfer pressure-induced forces to the face 210 of the sensor housing 202. This is achieved through the double diameter construction of the buffer rod 250, where the smaller cross-sectional area is sized to accommodate the acoustic transceiver element 230 and decouple thermal expansion of the sensor housing 202 from the acoustic path. The larger cross-sectional area of the axial buffer portion 256b is sized to accommodate the pressure-induced forces acting on the buffer rod 250. The transmission of forces into the sensor housing 202 substantially eliminates pressure-induced forces from acting on the acoustic transceiver element 230 and substantially eliminates the need for (e.g., piezo ceramic) pressure compensation, sizing to react the pressure induced forces, and substantially avoids wetted transducer design constraints.

By decoupling the acoustic transceiver element 230 from the fluid pressure environment, several advantages are observed. For example, fluid/fuel compatibility of the acoustic transceiver element 230 is not required, the acoustic transceiver element 230 frequency is not restricted by thickness requirements driven by pressure induced forces, the thickness of the acoustic transceiver element 230 required to support fluid pressure puts operating frequency far below operating requirements of time of flight measurement, and acoustic transducer frequency can be sized for acoustic optimization and low flow measurement accuracy.

For aircraft turbine fuel systems, mass fuel flow rate can be determined for an understanding of combustion energy content. This is solved through the use of the buffer rod 250. The internal design of the buffer rod 250 enables additional acoustic benefits which can be intentionally designed into the USFM system 100. For example, the configuration of the buffer rod 250 enables the controller 190 to determine reflection coefficients for fuel acoustic impedance measurement. This is achieved by introducing a transducer transmit amplitude response (e.g., echoes 320 or 620), achieved with the cavity 260 which acts as a substantially ideal reflector, and this amplitude can be compared to the return echoes of the buffer rod fluid interface (e.g., echoes 340 or 630). In some embodiments, the sensitivity of the axial end 254 is further enhanced by the matching layer 280, however, this will be ignored in order to simplify the equations below.

Fluid acoustic impedance can be determined by setting echo reflection effective areas equal to one another, for example by configuring the cross-sectional areas 209a and 209c appropriately. In some implementations, the areas can be non-equal, and a mathematical compensation can be integrated into the process. However, for the sake of clarity, the areas are assumed to be equal in the equations below. This allows for direct measurement of the reflection coefficient. The wave propagation within the buffer rod 250 is articulated such that in air, the echo returned from the face 262 is equivalent to the echo from the axial end 254.

The reflection coefficient is found through the use of short time Fourier transforms (STFT). The fast Fourier transforms (FFT) of the two echoes are found to determine the peak of the return echoes:

STFT→Amplitude=f(Frequency)

Therefore:
$|A|=|FFT(Echo_1)|_{f=f0}$
$|B|=|FFT(Echo_2)|_{f=f0}$

Where:
Echo$_1$ is one of the echoes 320 or 620 of FIGS. 3, 6A, and 6B respectively, Echo$_2$ is one of the echoes 340 or 630 of FIGS. 3, 6A, and 6B respectively, and f and f$_0$ are the transducer driving frequency. The reflection coefficient is then found from:

$$R = \frac{|A|}{|B|}$$

And, assuming the buffer rod 250 is in direct interface with the fluid or fuel (e.g., no matching layer 280 in this case):

$$R = \frac{Z_2 - Z_1}{Z_2 + Z_1}$$

Where R is the reflection coefficient.

$Z_2 = Z_{fluid}$ $Z_1 = Z_{buffer}$ $$Z_{fluid} = \frac{Z_{buffer}(1-R)}{1+R}$$

The impedance of the buffer rod 250 can be determined through characterization at the sensor level. With the buffer rod impedance known and the reflection coefficient being measured, the fluid impedance can now be solved for:

$Z_{fluid} = \rho_{fluid} C_{fluid}$

From the equations above, a speed of sound in fluid was solved. Since fluid impedance and fluid sound speed are known, fluid density can now be solved.

$$\rho_{fluid} = \frac{Z_{fluid}}{C_{fluid}}$$

Explicitly:

$$\rho_{fluid} = \frac{\left(\frac{Z_{buffer}(1-R))}{1+R}\right)}{\left(\frac{L(t_{up} + t_{down})}{2t_{up}t_{down}}\right)}$$

With volumetric fluid flow and density now known, the mass fluid flow rate can be found:

$$\dot{m}_{fluid} = Q_{fluid}\rho_{fluid} = C_d A V_{fluid}\frac{Z_{fluid}}{C_{fluid}}$$

Figure 7:
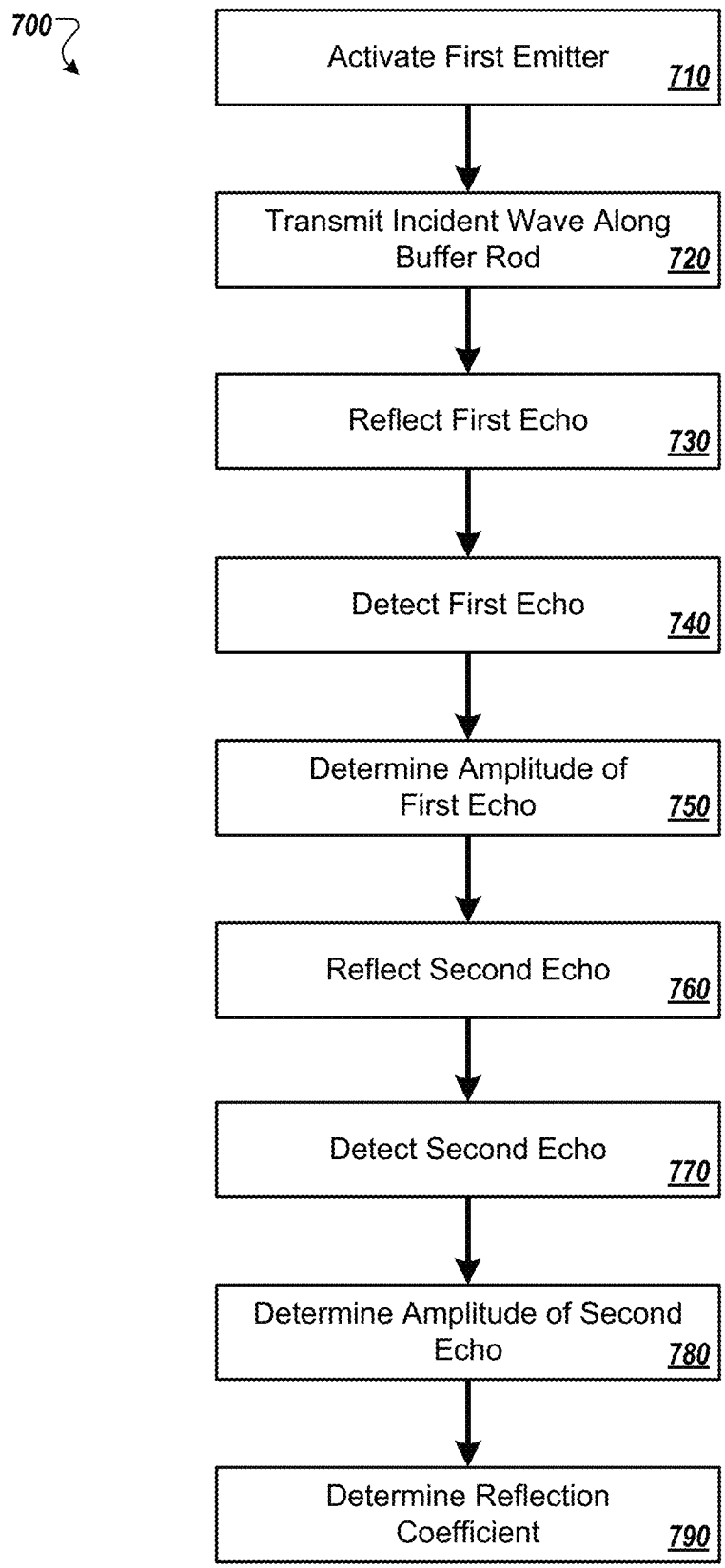
FIG. 7 is a flow chart that shows an example of a process for determining a fluid reflection coefficient.

FIG. 7 is a flow chart that shows an example of a process 700 for determining a fluid reflection coefficient. In some implementations, the process 700 can be used with the example ultrasonic sensor module 200 of FIGS. 1-2B.

At 710, a first emitter is activated to emit at least one incident wave. For example, the example acoustic transceiver element 230 can be activated to emit an indecent wave.

At 720 the incident wave is transmitted along a buffer rod having a first axial end abutted to the first emitter and a second axial end opposite the first axial end. For example, the incident wave can propagate through the buffer rod 250.

At 730 a first echo of the incident wave is reflected by a gap defined along a portion of the buffer rod. For example, the portion of the incident wave 310 can encounter the face 262 of the cavity 260 and be reflected as the echo 320.

At 740, the first echo is detected. For example, the echo 620 of FIGS. 6A and 6B can be detected.

At 750 a first amplitude of the first echo is determined. For example, a FFT can be performed on the echo 620 to determine an amplitude of the echo 620 (e.g., amplitude A as described above).

At 760 a second echo of the incident wave is reflected by the second axial end. For example, the portion of the incident wave 330 is reflected off the axial end 254 as the echo 340. In some implementations, the second echo can be reflected by a ¼ λ matching layer affixed to the second axial end, for example, the matching layer 280 at the axial end 254.

At 770, the second echo is detected. For example, the echo 630 of FIGS. 6A and 6B can be detected.

At 780, a second amplitude of the second echo is determined. For example, a FFT can be performed on the echo 640 to determine an amplitude of the echo 640 (e.g., amplitude B as described above).

At 790, a reflection coefficient based on the first amplitude and the second amplitude can be determined. For example:

$$R = \frac{|A|}{|B|}$$

Figure 8:
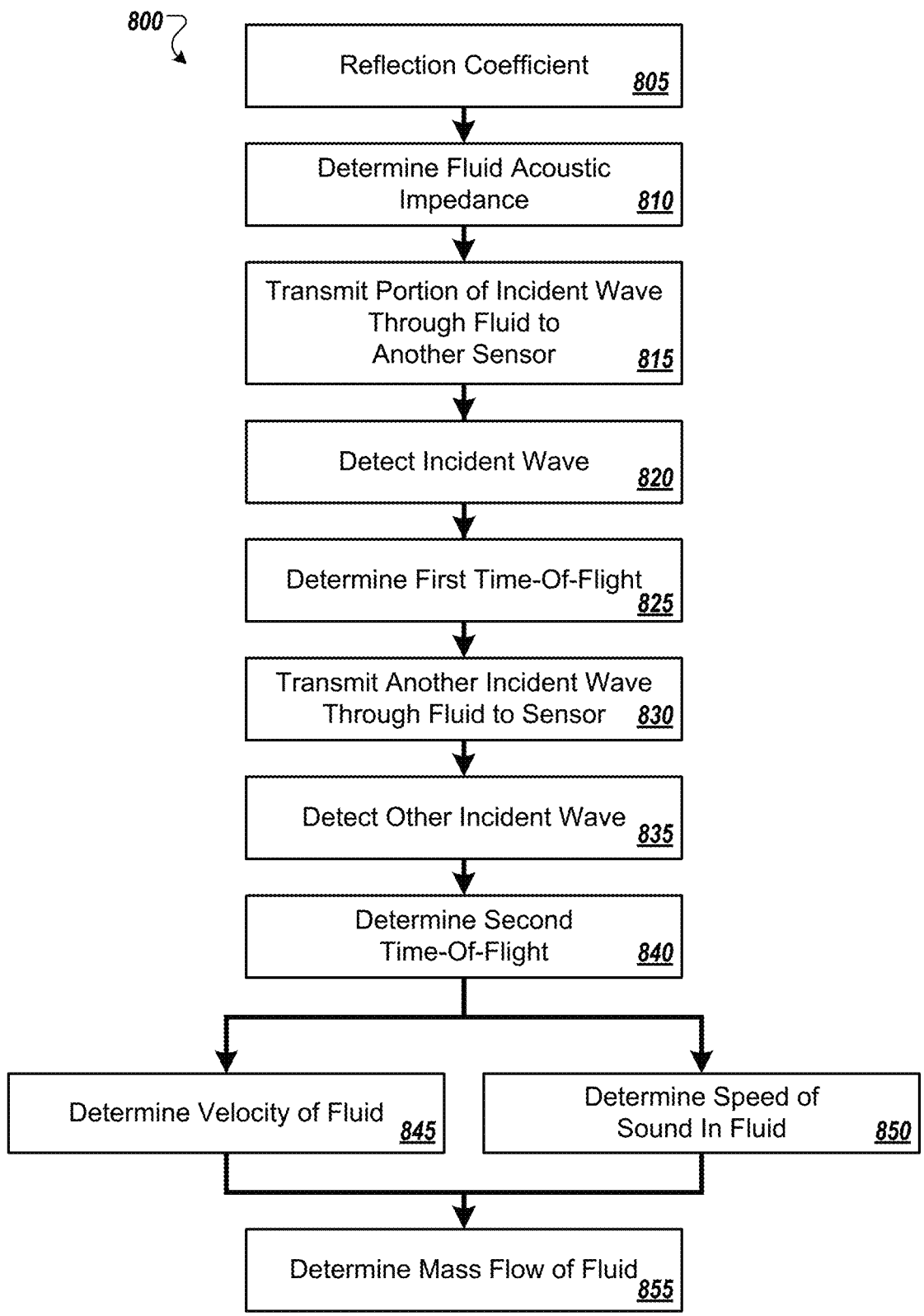
FIG. 8 is a flow chart that shows an example of a process for determining a mass fluid flow.

FIG. 8 is a flow chart that shows an example of a process 800 for determining a mass fluid flow. In some implementations, the process 800 can be used with the example USFM system 100 of FIG. 1.

At 805, a reflection coefficient value is received. For example, For example, the reflection coefficient R determined at 790 can be received.

At 810, a fluid acoustic impedance of a fluid at the second axial end is determined based on the determined reflection coefficient and a predetermined buffer rod acoustic impedance. For example, the reflection coefficient R can be used along with the predetermined buffer rod impedance $Z_{buffer}$ to determine $Z_{fluid}$, as described above.

At 815, a portion of the incident wave is transmitted at the second axial end through the fluid to a sensor arranged a predetermined distance away from and opposite the first emitter, where the fluid is within a tubular fluid conduit having a predetermined cross-sectional area. For example, the incident wave 670 of FIGS. 6A-6B can travel through the fluid from the ultrasonic sensor module 200 that is upstream to the ultrasonic sensor module 200 that is downstream.

At 820, the second sensor detects the portion of the incident wave. For example, the ultrasonic sensor module 200 that is downstream can detect the incident wave 670.

At 825, a first time of flight of the portion of the incident wave is determined based on the detected portion of the incident wave. For example, $t_{down}$ can be determined.

At 830, another incident wave is transmitted, by a second emitter, through the fluid to the first sensor. For example, the ultrasonic sensor module 200 that is downstream can be activated to emit another indecent wave upstream.

At 835, the first sensor detects the other incident wave, and at 840 a second time of flight of the other incident wave is determined based on the detected other incident wave. For example, $t_{up}$ can be determined.

At 845, a velocity of the fluid within the tubular fluid conduit is determined. For example, $V_{fluid}$ can be determined as:

$$V_{fluid} = \frac{L(t_{up} - t_{down})}{2t_{up}t_{down}}$$

At 850, a speed of sound within the fluid is determined. For example, $C_{fluid}$ can be determined as:

$$C_{fluid} = \frac{L(t_{up} + t_{down})}{2t_{up}t_{down}}$$

At 855, a mass fluid flow rate is determined based on at least the predetermined cross-sectional area, the determined velocity of the fluid, the determined fluid acoustic impedance, and the determined speed of sound. For example:

$$\dot{m}_{fluid} = Q_{fluid}\rho_{fluid} = C_d A V_{fluid} \frac{Z_{fluid}}{C_{fluid}}$$

In some implementations, one or both of the first emitter and the first sensor can be piezo elements. In some implementations, the piezo element can include the first emitter and the first sensor. For example, the emitter and sensor can be separate components, or the acoustic transceiver element 230 can perform the emitting and detecting functions within the ultrasonic sensor module 200.

Figure 9:
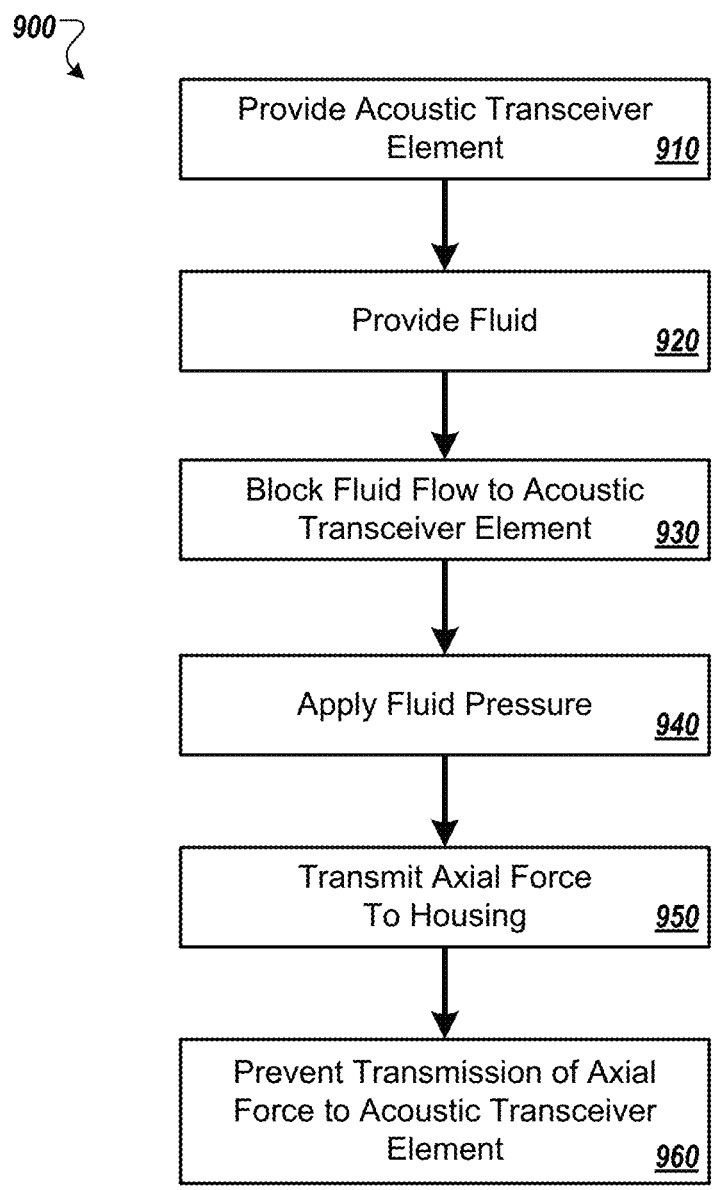
FIG. 9 is a flow chart that shows an example of a process for resisting effects of fluid exposure on the acoustic transducer of the module of FIG. 2A.

FIG. 9 is a flow chart that shows an example of a process 900 for resisting effects of fluid exposure on the acoustic transceiver element 230 of the example ultrasonic sensor module 200 of FIGS. 1-4. At 910, a sensor is provided. The sensor includes a sensor housing having an interior surface defining a sensor axis and an axial interior sensor housing cavity having a first axial sensor housing portion having a first cross-sectional area perpendicular to the sensor axis, a second axial sensor housing portion arranged adjacent to the first axial sensor housing portion along the sensor axis and having a second cross-sectional area larger than the first cross-sectional area perpendicular to the sensor axis, and a face extending from the interior surface of the first axial housing portion to the interior surface of the second housing portion, a buffer rod having a first axial end and a second axial end opposite the first axial end and having a first axial buffer portion arranged within the first housing portion and having the first axial end, a second axial buffer portion arranged within the second housing portion and abutting the face, and having the second axial end, and a third axial buffer portion, extending axially between the first axial buffer portion and the second axial buffer portion, and having a third cross-sectional area, smaller than the first cross-sectional area, perpendicular to the sensor axis, and an acoustic transceiver element acoustically mated to the first end. For example, the ultrasonic sensor module 200 can be provided.

At 920, a fluid is provided at the second axial end. For example, the fluid 301, such as a fuel, can be provided in the fluid cavity 120a or 120b so as to contact the axial end 254.

At 930, the buffer rod and the sensor housing blocks fluid flow from the second end to the acoustic transceiver element. For example, as discussed in the description of FIG. 4, the acoustic transceiver element 230 is separated from the fluid 301 by the sensor housing 202 and the buffer rod 250, and the fluid 301 by the sensor housing 202 and the buffer rod 250 are configured to prevent the fluid 301 from flowing to the acoustic transceiver element 230.

In some implementations, fluid flow from the second end to the acoustic transceiver element can be blocked by the sensor housing and the second axial buffer portion. For example, the fluid 301 is prevented from flowing to the acoustic transceiver element 230 by interference between the sensor housing 202 and the axial buffer portion 256b.

At 940, a fluid pressure is applied against the second axial end to produce an axial force against the buffer rod. For example, the fluid force 410 can be applied against the axial end 254.

At 950, the buffer rod transmits the axial force to the sensor housing. For example, the buffer rod 250 transmits the force 420 to the sensor housing 202.

At 960, the sensor housing prevents transmission of the axial force to the acoustic transceiver element. In some implementations, the process 900 can also include transmitting, by the second axial portion, the axial force to the face, wherein the face interferes with axial movement of the buffer rod toward the acoustic transceiver element. For example, any movement of the buffer rod 250 into the sensor cavity 204 is prevented by the counteractive force 430 created through contact between the axial buffer portion 256b and the face 210.

Figure 10:
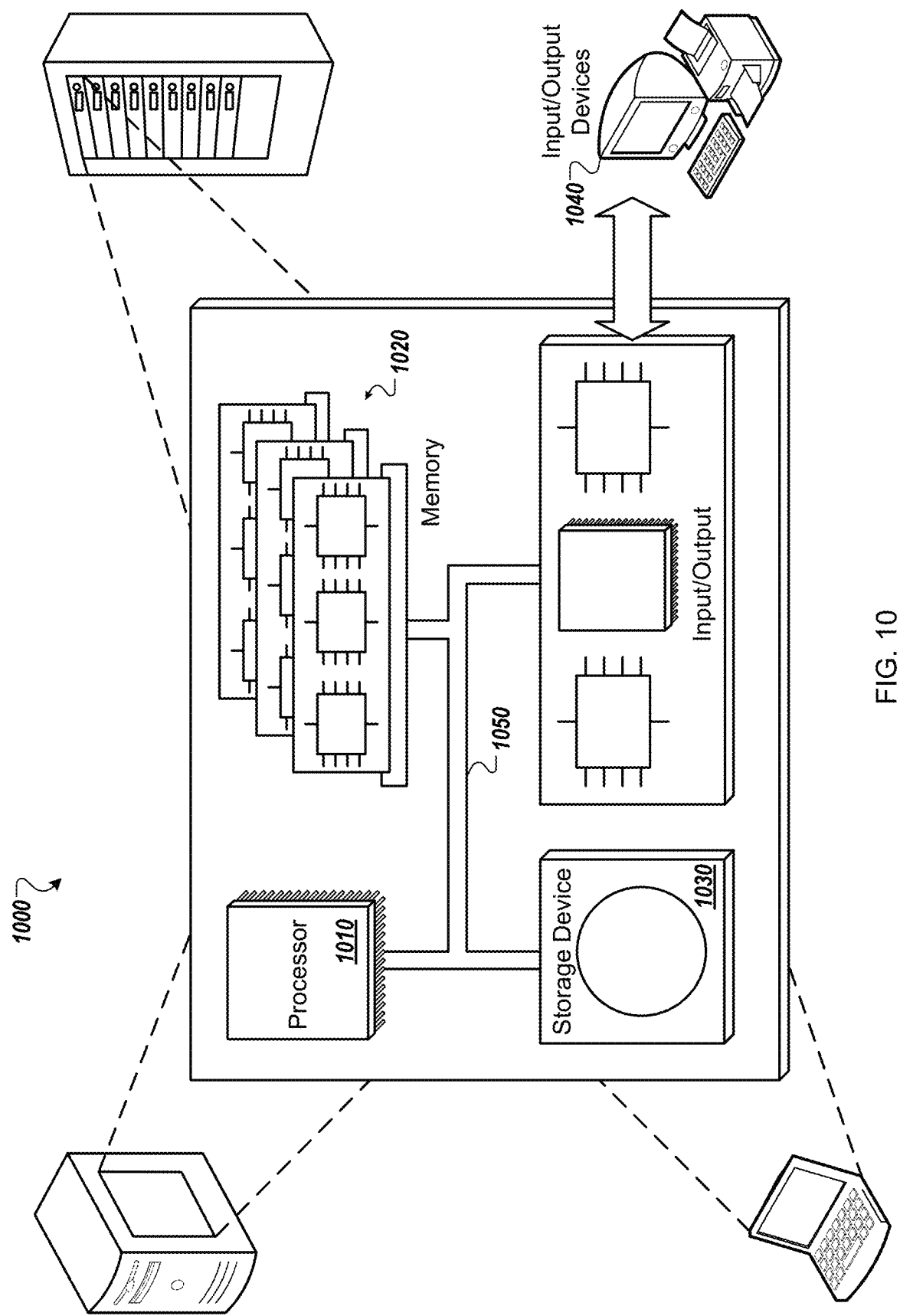
FIG. 10 is a schematic diagram of an example of a generic computer system.

FIG. 10 is a schematic diagram of an example of a generic computer system 1000. The system 1000 can be used for the operations described in association with the process 700, 800, and/or 900 according to one implementation. For example, the system 1000 may be included in the controller 190.

The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces. In another implementation, input/output device 1040 includes a serial link, (e.g., Ethernet, CAN, RS232, RS485, optical fiber), for example, to interface to a remote host and/or to send measurement results, either in a command/response protocol, or at some periodic update rate after a short initialization period (e.g., <1 sec). In another implementation the input/output device 1040 includes a data bus connection to a second computer system or processor.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Figure 11:
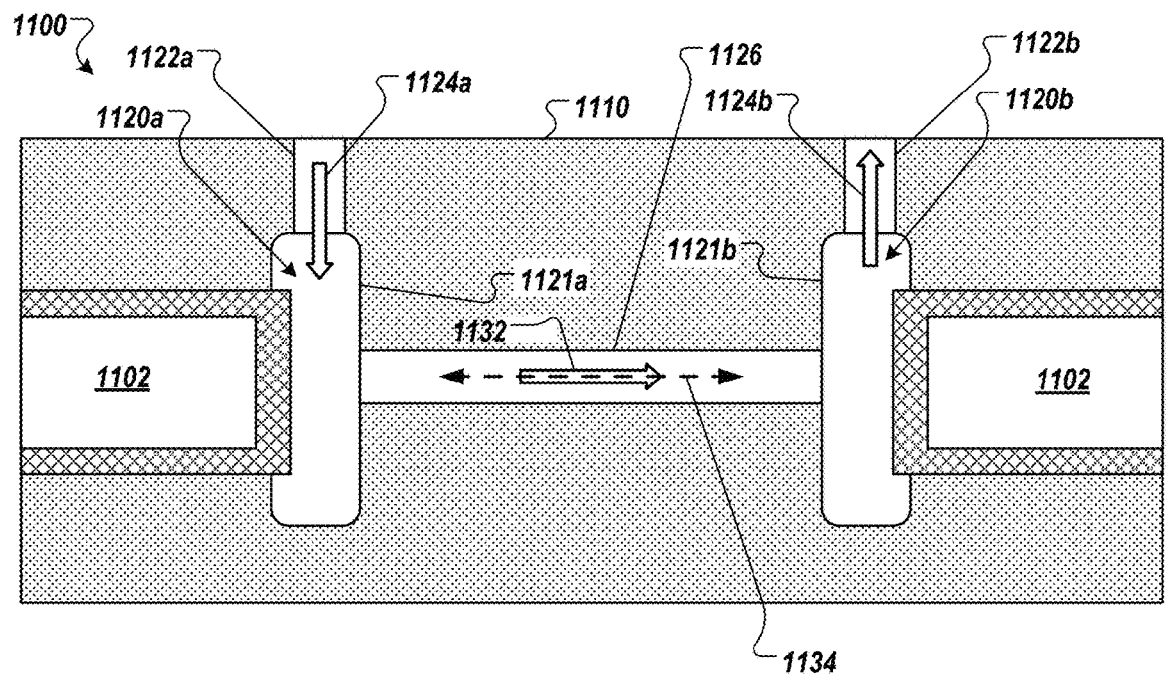
FIG. 11 is a cross-sectional diagram of an example baseline ultrasonic flow measurement system.

FIG. 11 is a cross-sectional diagram of an example baseline ultrasonic flow measurement (USFM) system 1100. In some embodiments, the system 1100 can be a modification of the example ultrasonic flow measurement (USFM) system 100 of FIG. 1. For the purpose of comparison, generally speaking, the system 1100 is presented as a baseline configuration against which several examples of USFM systems having additional flow conditioning features can be compared (e.g., the USFM systems discussed in the descriptions of FIGS. 12-19).

The USFM system 1100 includes a fluid housing 1110 and two ultrasonic sensor modules 1102. In some embodiments, the sensor modules 1102 can be the example ultrasonic sensor modules 200 of FIGS. 1 and 2A. The fluid housing 1110 includes an axial fluid housing cavity 1120*a* defined by an interior surface 1121*a*, and an axial fluid housing cavity 1120*b* defined by an interior surface 1121*b*. A fluid port 1122*a* defines a fluid path 1124*a* connected to the fluid cavity 1120*a*. A fluid port 1122*b* defines a fluid path 1124*b* connected to the fluid cavity 1120*b*. The fluid housing 1110 also defines a cavity 1126 that extends between the fluid cavity 1120*a* and the 1120*b*. The cavity 1126 defines a fluid path 1132 along a conduit axis 1134. The cavity 1126 fluidically connects the fluid cavity 1120*a* and the fluid cavity 1120*b*, putting the fluid cavity 1120*a* in fluidic communication with the fluid cavity 1120*b*.

As a general rule of thumb of fluid dynamics, it can take 10 or more lengths-to-diameters (L/D) of straight pipe following a disturbance for a fluid flow to stabilize. In some embodiments, flow conditioning can be based on Reynold's number (e.g., Re, ratio of dynamic/static viscosities), roughness of the interior surface of the flow conduit, coefficient of discharge (e.g., Cd, represents the blocking factor of an orifice or other obstruction in the flow path), and other factors that can affect fluid flow. In such cases, fully developed flow may only begin to occur a substantial distance downstream of the pipe inlet. In some implementations, such long pipes may promote stable flow while negatively impacting other factors. For example, the length of the cavity 1126 needed to achieve stable flow may exceed the design constraints of a target application (e.g., the size of the housing 1110 needed in order to define a sufficiently long cavity 1126 may not fit within the available space of a target design). In another example, the cavity 1126 may become long enough to negatively impact the USFM measurement process (e.g., the fluid path 132 may become long enough to cause the transmitted signals to become highly attenuated and difficult to process accurately).

Generally speaking, the cavity 1126 is too short to condition fluid flow along the fluid path 1132. The system 1100 shows an example flow body design that is an open core concept, where the flow body has open flow area to the inlets and outlets with the transducers located on the axial ends of the housing. In this configuration, fuel flow enters and leaves the flow body through an unobstructed path. While this design is simple to manufacture, it comes with fluid dynamic downfalls. The design has been evaluated across a 100:1 turn down ratio. Near the low end of the turn down ratio, the Reynolds numbers are near or are within the laminar region. Conversely, at the high end of the turn down ratio, the Reynolds number is wholly turbulent.

As discussed above, the USFM system 1100 is provided as a baseline example against which other USFM configurations can be compared. Examples of flow-conditioning USFM configurations having additional structures for conditioning fluid flow will be discussed further in the descriptions of FIGS. 12-19.

Figure 12:
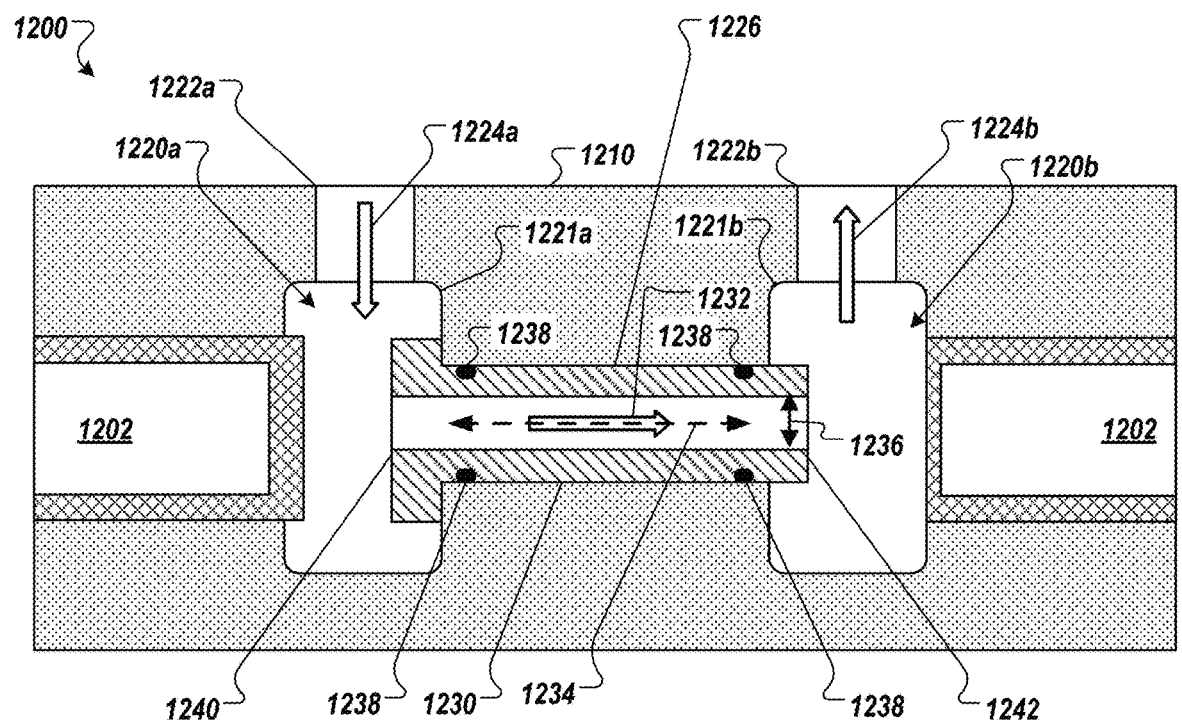
FIG. 12 is a cross-sectional diagram of an example ultrasonic flow measurement system having a flow insert.

FIG. 12 is a cross-sectional diagram of an example ultrasonic flow measurement system 1200 having a fluid control conduit 1230. In some embodiments, the system 1100 can be a modification of the example ultrasonic flow measurement (USFM) systems 100 or 1100 of FIGS. 1 and 11.

The USFM system 1200 includes a fluid housing 1210 and two ultrasonic sensor modules 1202 (e.g., sensor apparatus). In some embodiments, the sensor modules 1202 can be ultrasonic transducer apparatus, such as the example ultrasonic sensor modules 200 of FIGS. 1 and 2A. The fluid housing 1210 includes an axial fluid housing cavity 1220*a* defined by an interior surface 1221*a*, and an axial fluid housing cavity 1220*b* defined by an interior surface 1221*b*. A fluid port 1222*a* (e.g., a fluid inlet) defines a fluid path 1224*a* (e.g., an inlet fluid flow path) connected to the fluid cavity 1220*a*. A fluid port 1222*b* (e.g., a fluid outlet) defines a fluid path 1224*b* (e.g., an outlet fluid flow path) connected to the fluid cavity 1220*b*. The fluid housing 1210 also defines a cavity 1226 that extends between the fluid cavity 1220*a* and the 1220*b*.

The fluid housing 1210 also includes the fluid control conduit 1230 that defines a fluid path 1232 along a conduit axis 1234 (e.g., the major axis of the fluid control conduit 1230). The fluid control conduit 1230 has a conduit inlet 1240 and a conduit outlet 1242, and fluidically connects the fluid cavity 1220*a* and the fluid cavity 1220*b*, putting the fluid cavity 1220*a* in fluidic communication with the fluid cavity 1220*b*. The fluid control conduit 1230 is configured with a predetermined flow geometry to define a linear fluid flow path along the major axis.

In use, fluid flows in through the fluid port 1222*a*, where it flows along the fluid path 1224*a*. The fluid flow is redirected to flow along the fluid path 1232, which is non-parallel to the fluid path 1224*a*. Fluid flow exiting the fluid control conduit 1230 is re-directed to flow along the fluid path 1224*b*, which is also non-parallel to the fluid control conduit 1230.

The fluid control conduit 1230 has a predetermined flowable area 1236 and shape (e.g., square, tapered, and/or curved edges, parallel or tapered walls, to affect fluid flow behavior). In some implementations, the fluid housing 1210 can be used across many applications, and the fluid control conduit 1230 can be an interchangeable, specialized subcomponent (e.g., an adapter) that can adapt the USFM system 1200 for particular fluid types, applications, and/or operational conditions.

A collection of fluid seals 1238 are arranged in sealing contact between the fluid control conduit 1230 and the fluid housing 1210. The fluid seals 1238 are configured to prevent fluid leakage flow in parallel with the flowable area 1236. In some embodiments, the fluid seals 1238 can dampen the propagation of vibrations between the fluid control conduit 1230 and the fluid housing 1210. In some embodiments, the fluid seals 1238 can modify an acoustic interface. For example, the fluid seals can buffer an acoustic impedance mismatch that might otherwise occur if the fluid control conduit 1230 were arranged in direct contact with the fluid housing 1210 (e.g., the fluid control conduit 1230 can float within the fluid housing 1210 upon the fluid seals 1238).

In some embodiments, the internal bore and/or the outer surface of the fluid control conduit 1230 can be formed with geometrical features configured to reduce measurement errors induced by the propagation of higher mode harmonics of the measurement signal frequency. For example, undesired signal energy can be scattered and/or delayed by features such as knurling, dimples, threads, grooves, bumps, roughness or any other appropriate formation that can disperse, attenuate, or otherwise reduce the propagation of ultrasonic signals.

In some embodiments, the fluid control conduit 1230 can have a predetermined internal bore diameter-to-length ratio that is selected to reduce measurement errors induced by the propagation of higher mode harmonics of the measurement signal frequency. For example the fluid control conduit 1230 can be configured with predetermined diameter and length to have a predetermined fundamental frequency, and that places the ultrasonic sensor modules 1202 at the pressure nodes of the fundamental frequency so they receive wave energy at the fundamental frequency wavelength.

In some implementations, use of the fluid control conduit 1230 as a modular flow body can allow for various manufacturing methods and feature types to be integrated easily into the design configuration, such as an integral axis symmetric inlet flow conditioner, and/or an integral axis symmetric outlet flow conditioner. In some embodiments, the fluid control conduit 1230 can be configured as a removable inner housing having a predefined geometry, to promote modularity and ease of serviceability and/or replacement.

Figure 13A:
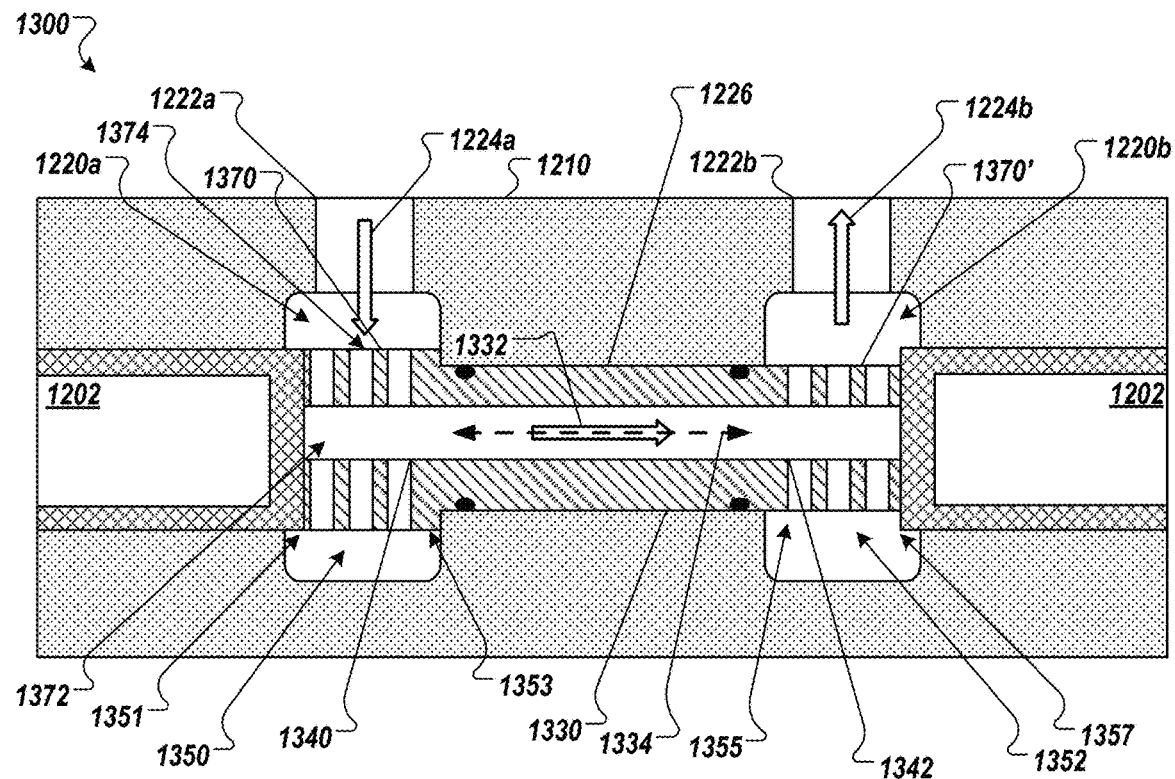
FIG. 13A is a cross-sectional diagram of an example ultrasonic flow measurement system having flow conditioners.

FIG. 13A is a cross-sectional diagram of an example ultrasonic flow measurement system 1300 having a flow conditioner 1350 and a flow conditioner 1352. In some embodiments, the USFM system 1300 can be a modification of the example ultrasonic flow measurement (USFM) systems 100, 1100, or 1200 of FIGS. 1, 11, and 12.

The USFM system 1300 includes a fluid housing 1210 and the two ultrasonic sensor modules 1202. In general, the USFM system 1300 is a fluid flow conditioning apparatus that is configured to provide fluid flow conditioning for ultrasonic flow sensing of the conditioned fluid flow. The fluid housing 1210 is a generally tubular outer housing that includes the axial fluid housing cavity 1220*a* and the axial fluid housing cavity 1220*b*. The fluid port 1222*a* defines the fluid path 1224*a* connected to the fluid cavity 1220*a*. The fluid port 1222*b* defines the fluid path 1224*b* connected to the fluid cavity 1220*b*. The fluid housing 1210 also defines the cavity 1226 that extends between the fluid cavity 1220*a* and the 1220*b*.

The fluid housing 1210 also includes a fluid control conduit 1330 (e.g., a linear fluid conduit) that defines a fluid path 1332 along a conduit axis 1334 (e.g., the major axis of the fluid control conduit 1330). The fluid control conduit 1330 has a conduit inlet 1340 and a conduit outlet 1342, and fluidically connects the fluid cavity 1220*a* and the fluid cavity 1220*b*, putting the fluid cavity 1220*a* in fluidic communication with the fluid cavity 1220*b*. The fluid control conduit 1330 is configured with a predetermined flow geometry to define a linear fluid flow path along the major axis. In some embodiments, the fluid control conduit 1330 can be configured as a removable inner housing to promote modularity, and to promote and ease of serviceability and/or replacement.

The USFM system 1300 includes a flow conditioner 1350 in fluidic communication with the conduit inlet 1340. The USFM system 1300 also includes a flow conditioner 1352 in fluidic communication with the conduit outlet 1342. The flow conditioner 1350 has a body 1370 having an end 1351 that is distal from the conduit inlet 1340, and an end 1353 opposite the end 1351 and defines a fluid conditioner outlet.

Figure 13B:
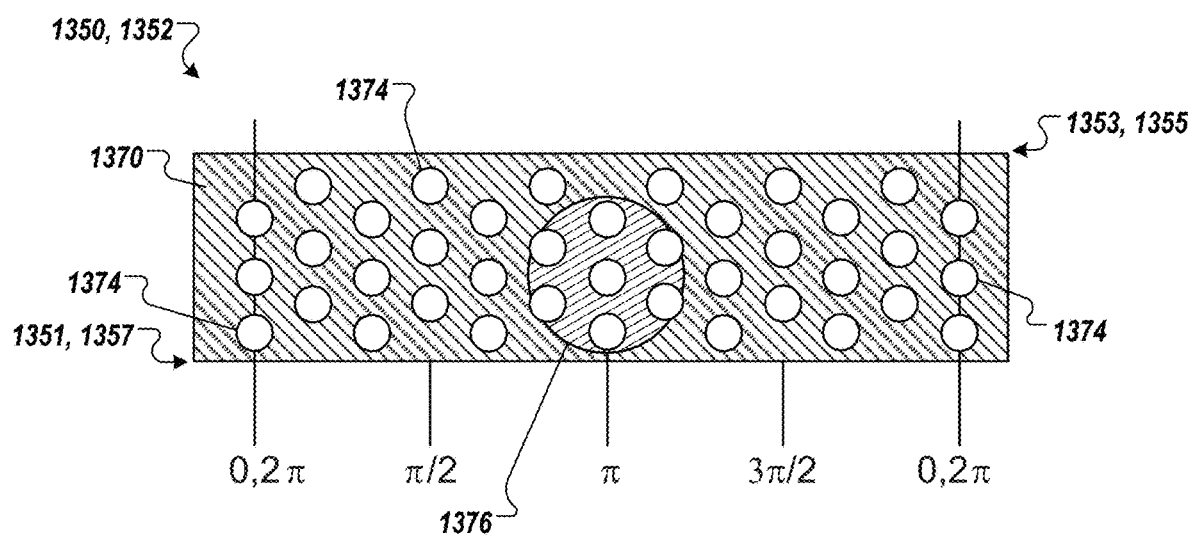
FIG. 13B is cylindrical projection view of an example flow conditioner configuration.

FIG. 13B is cylindrical projection (e.g., flattened, unwrapped) view of the example flow conditioner 1350. The body 1370 (e.g., housing, shell) surrounds a central cavity 1372. The body 1370 includes a collection of apertures 1374 (e.g., bores, conduits) that fluidically connect the central cavity to the radially outer surface of the flow conditioner 1350. A projection 1376 represents the radial location of the fluid port 1222*a* relative to the body 1370.

In the illustrated examples of FIGS. 13A and 13B, the example flow conditioner 1350 is an axis symmetric flow conditioner. For example, the flow conditioner 1350 is generally cylindrical, and the arrangement of the apertures 1374 is arranged symmetrically about the axis of the cylinder. In the illustrated examples, the apertures 1374 are uniformly circular or cylindrical. In some embodiments, the apertures 1374 can be formed in various sizes, and/or with shapes other than circles or cylinders. For example, some of the apertures 1374 can have larger or smaller diameters than others. In other examples, some or all of the apertures can be formed as tubular conduits having cross-sections that are circular, ovoid, elliptical, square, triangular, polyhedral, pseudo-random, or any appropriate combination of these and/or other shapes. In some embodiments, the conductive lengths of the apertures 1374 can be smooth and uniform, or may be formed with other appropriate shapes and/or roughness (e.g., straight and smooth, helical and patterned, tapered and rough).

In the illustrated example, the flow conditioner 1352 has a form that is substantially identical to the example flow conditioner 1350. The flow conditioner 1352 has a body 1370' having an end 1357 that is distal from the conduit outlet 1342, and an end 1355 opposite the end 1357 and defines a fluid conditioner inlet. In some embodiments, the flow conditioner at the conduit inlet (e.g., the conduit inlet 1340) can be identical to or a mirror image of the flow conditioner at the conduit outlet (e.g., the conduit outlet 1342). In some other embodiments, the flow conditioner at the conduit inlet (e.g., the conduit inlet 1340) can be different from the flow conditioner at the conduit outlet (e.g., the conduit outlet 1342), as will be discussed in the descriptions of FIGS. 15A-18C.

Figure 14A:
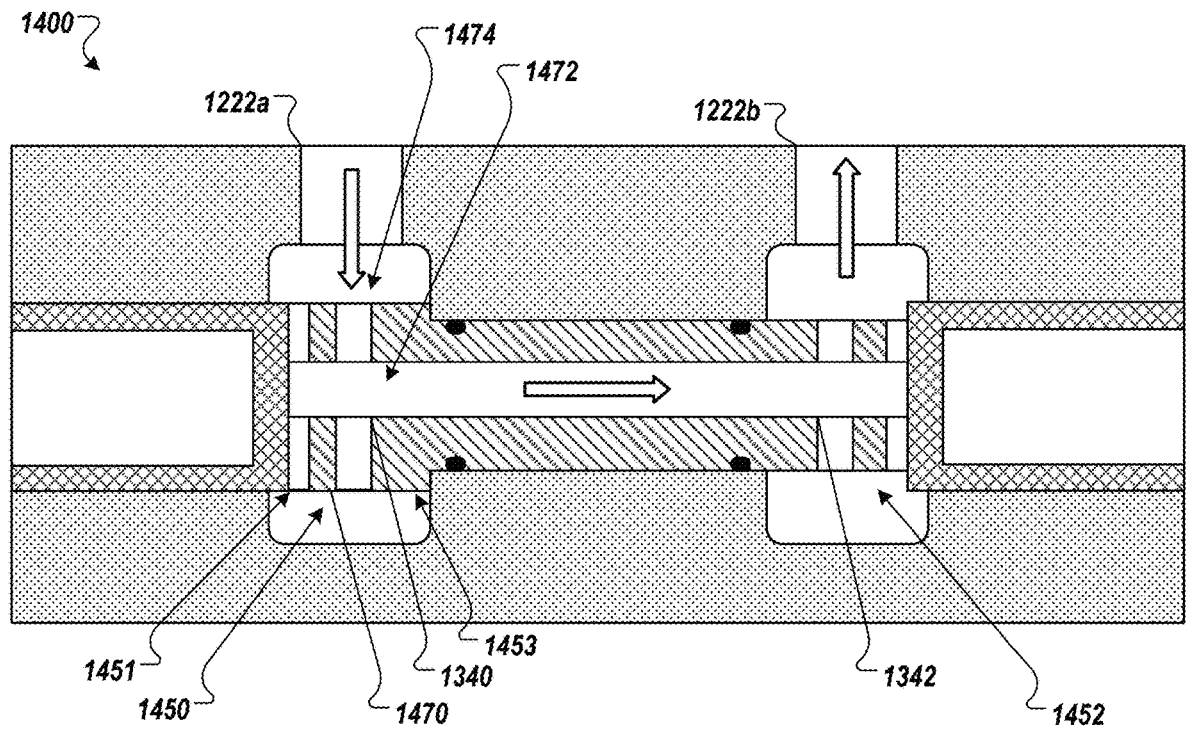
FIG. 14A is a cross-sectional diagram of another example ultrasonic flow measurement system having flow conditioners.

FIG. 14A is a cross-sectional diagram of another example ultrasonic flow measurement system 1400 having a flow conditioner 1450 and a flow conditioner 1452. In some embodiments, the USFM system 1400 can be a modification of the example ultrasonic flow measurement (USFM) systems 100, 1100, 1200, or 1300 of FIGS. 1, and 11-13B.

The structure of the example USFM 1400 is substantially similar to the structure of the example USFM system 1300, with the flow conditioners 1350 and 1352 replaced by the flow conditioners 1450 and 1452. The flow conditioner 1450 is in fluidic communication with the conduit inlet 1340, and the flow conditioner 1452 is in fluidic communication with the conduit inlet 1342. The flow conditioner 1450 has a body 1470 having an end 1451 that is distal from the conduit inlet 1340, and an end 1453 opposite the end 1451.

Figure 14B:
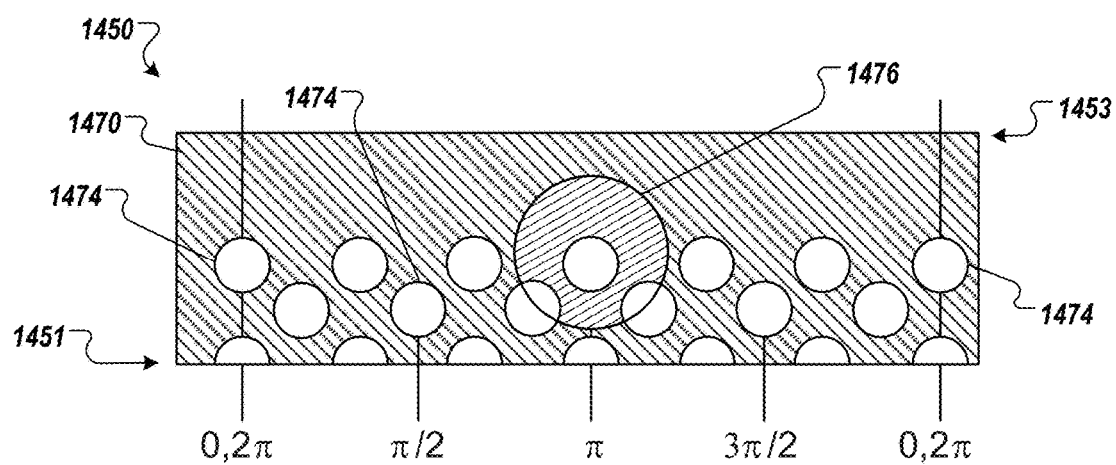
FIG. 14B is cylindrical projection view of another example flow conditioner configuration.

FIG. 14B is cylindrical projection (e.g., flattened, unwrapped) view of the example flow conditioner 1450. The body 1470 (e.g., housing, shell) surrounds a central cavity 1472. The body 1470 includes a collection of apertures 1474 (e.g., bores, conduits) that fluidically connect the central cavity to the radially outer surface of the flow conditioner 1450. A projection 1476 represents the radial location of the fluid port 1222*a* relative to the body 1470.

In the illustrated examples of FIGS. 14A and 14B, the example flow conditioner 1450 is an axis symmetric flow conditioner. For example, flow conditioner 1450 is generally cylindrical, and the arrangement of the apertures 1474 is arranged symmetrically about the axis of the cylinder.

In the illustrated example the flow conditioner 1452 has a form that is substantially identical to the example flow conditioner 1450. In some embodiments, the flow conditioner at the conduit inlet (e.g., the conduit inlet 1340) can be identical to or a mirror image of the flow conditioner at the conduit outlet (e.g., the conduit outlet 1342). In some other embodiments, the flow conditioner at the conduit inlet (e.g., the conduit inlet 1340) can be different from the flow conditioner at the conduit outlet (e.g., the conduit outlet 1342), as will be discussed in the descriptions of FIGS. 15A-15C.

Figure 15A:
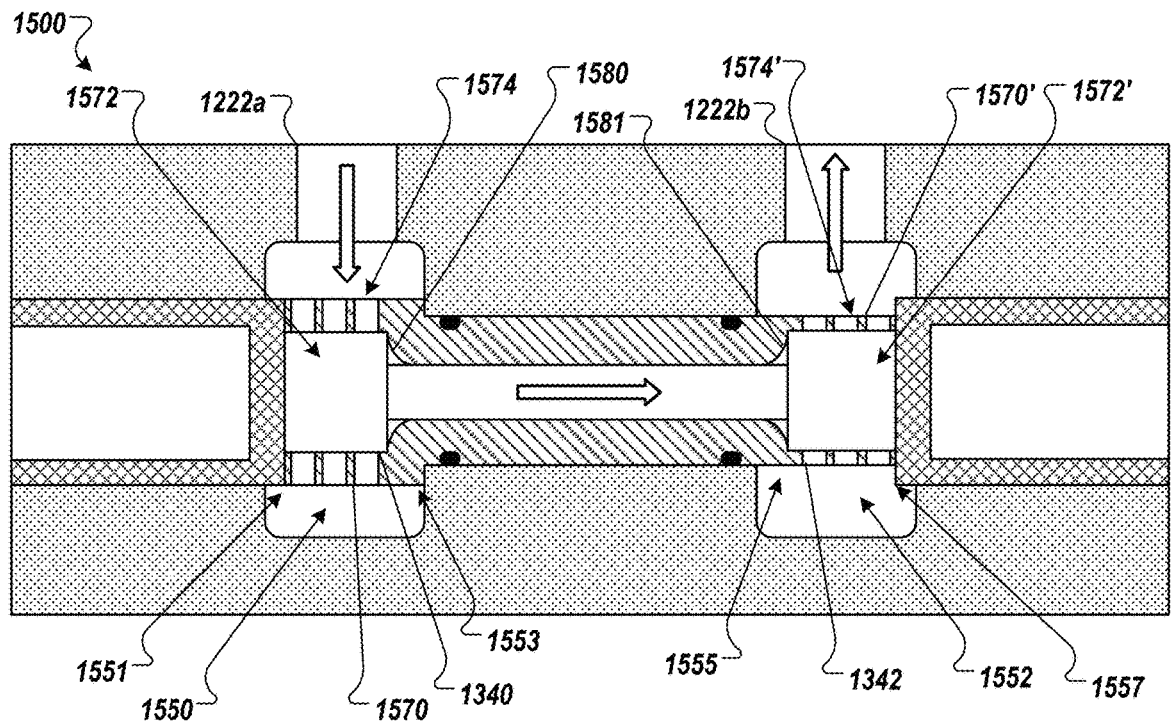
FIG. 15A is a cross-sectional diagram of another example ultrasonic flow measurement system having flow conditioners.

FIG. 15A is a cross-sectional diagram of another example ultrasonic flow measurement system 1500 having a flow conditioner 1550 and a flow conditioner 1552. In some embodiments, the USFM system 1500 can be a modification of the example ultrasonic flow measurement (USFM) systems 100, 1100, 1200, 1300, or 1400 of FIGS. 1, and 11-14B.

The structure of the example USFM system 1500 is substantially similar to the structure of the example USFM system 1300, with the flow conditioners 1350 and 1352 replaced by the flow conditioners 1550 and 1552. The flow conditioner 1550 is in fluidic communication with the conduit inlet 1340, and the flow conditioner 1552 is in fluidic communication with the conduit inlet 1340. The flow conditioner 1550 has a body 1570 having an end 1551 that is distal from the conduit inlet 1340, and an end 1553 opposite the end 1551. The flow conditioner 1550 also includes a contoured profile 1580 that tapers toward the end 1553.

Figure 15B:
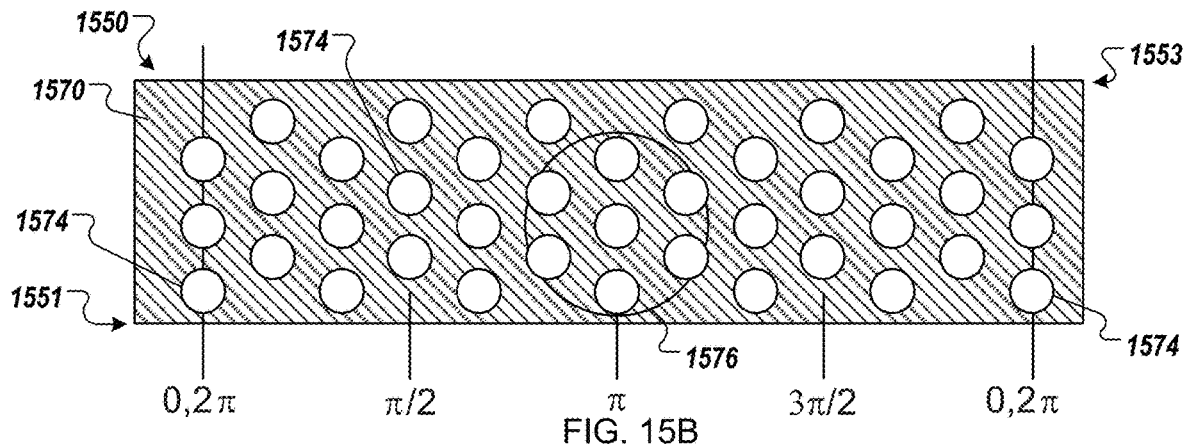
FIG. 15B is cylindrical projection view of an example inlet flow conditioner configuration.

FIG. 15B is cylindrical projection (e.g., flattened, unwrapped) view of the example flow conditioner 1550. The body 1570 (e.g., housing, shell) surrounds a central cavity 1572. The body 1570 includes a collection of apertures 1574 (e.g., bores, conduits) that fluidically connect the central cavity to the radially outer surface of the flow conditioner 1550. A projection 1576 represents the radial location of the fluid port 1222*a* relative to the body 1570.

In the illustrated examples of FIGS. 15A and 15B, the example flow conditioner 1550 is an axis symmetric flow conditioner. For example, flow conditioner 1550 is generally cylindrical, and the arrangement of the apertures 1574 is arranged symmetrically about the axis of the cylinder.

In the illustrated example the flow conditioner 1552 has a form that is different from the example flow conditioner 1550. The flow conditioner 1550 has a body 1570 having an end 1557 that is distal from the conduit outlet 1342, and an end 1555 opposite the end 1557. The flow conditioner 1552 also includes a contoured profile 1581 that tapers toward the end 1555. To promote fluid dynamic axis symmetry, the flow conditioner 1552 has been configured to resist asymmetry in the inlet/outlet coring to promote symmetric fuel velocity profiles.

In some embodiments, the flow conditioner at the conduit inlet (e.g., the conduit inlet 1340) can be identical to or a mirror image of the flow conditioner at the conduit outlet (e.g., the conduit outlet 1342), as was previously discussed in the descriptions of FIGS. 13A-14B.

Figure 15C:
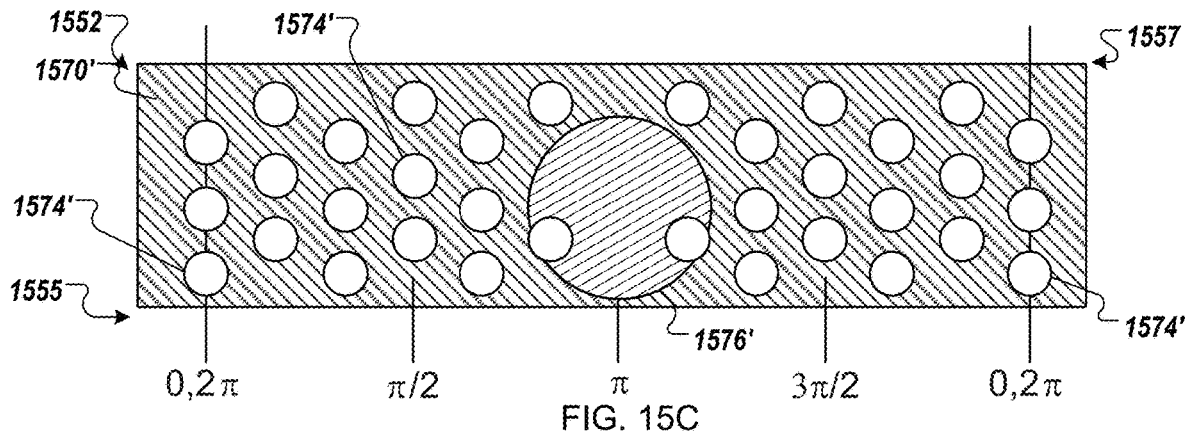
FIG. 15C is a cylindrical projection view of an example outlet flow conditioner configuration.

FIG. 15C is cylindrical projection view of the example flow conditioner 1552. A body 1570' surrounds a central cavity 1572'. The body 1570' includes a collection of apertures 1574' that fluidically connect the central cavity to the radially outer surface of the flow conditioner 1552. A projection 1576' represents the radial location of the fluid port 1222b relative to the body 1570'.

In the illustrated examples of FIGS. 15A and 15C, the example flow conditioner 1552 is an axis asymmetric flow conditioner. For example, flow conditioner 1552 is generally cylindrical, and the arrangement of the apertures 1574' is arranged asymmetrically about the axis of the cylinder. Axis asymmetry can be introduced within the flow body to encourage and promote axis symmetric fluid velocity profiles. The interaction of the flow body to the inlet and outlet cores introduces asymmetry in the USFM system 1500. This asymmetry at the inlets and outlets to the flow body generates asymmetric fluid dynamic behavior, similar to a nozzle flapper at a non-null state.

In the illustrated example, the flow conditioner 1552 has a form that is different from the example flow conditioner 1550. In some embodiments, the flow conditioner at the conduit inlet (e.g., the conduit inlet 1340) can be identical to or a mirror image of the flow conditioner at the conduit outlet (e.g., the conduit outlet 1342), as was discussed in the descriptions of FIGS. 13A-14B.

In some embodiments, (e.g., to further promote flow velocity symmetry) flow body contouring in the form of profiles can be incorporated into the geometry of the flow bodies. For example, a sigmoid and log function flow shaping feature can be integrated at the inlet and outlet of the flow body. In some embodiments, profiles can improve the performance of the USFM system 1500. For example, flow symmetry can be improved at the faces of the transducer (e.g., time transit symmetry, integral average of velocity can be centered within the flow body, velocity matching across flow domain), cavitation control can be improved, flow swirl can be reduced, correction factor across the flow range can be improved, and minimum flow and maximum flow velocity profiles can be made more consistent (e.g., reducing the derivative of Re dependent K factors).

Figure 16:
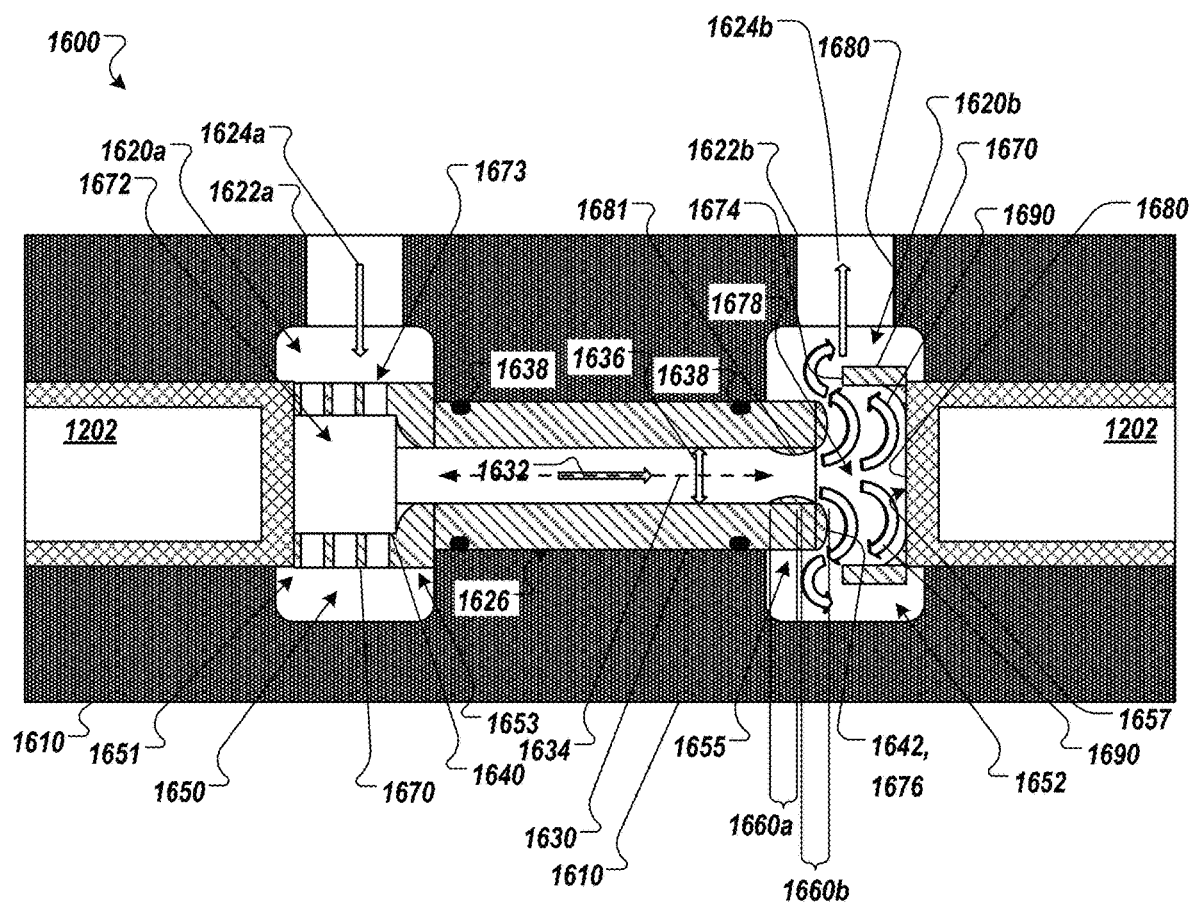
FIG. 16 is a cross-sectional diagram of another example ultrasonic flow measurement system having flow conditioners.

FIG. 16 is a cross-sectional diagram of another example ultrasonic flow measurement system 1600 having a flow conditioner 1650 and a flow conditioner 1652. In some embodiments, the USFM system 1600 can be a modification of the example ultrasonic flow measurement (USFM) systems 100, 1100, 1200, 1300, 1400, or 1500 of FIGS. 1, and 11-15C.

The structure of the example USFM system 1600 is substantially similar to the structure of the example USFM system 1500, with the flow conditioner 1552 replaced by the flow conditioner 1652, and the flow conditioner 1650 can be the example flow conditioner 1550 of FIG. 15A-15B. A fluid housing 1610 includes a fluid port 1622a (e.g., a fluid inlet) that provides a fluid path 1624a (e.g., an inlet fluid flow path) connected to the fluid cavity 1620a. A fluid port 1622b (e.g., a fluid conditioner outlet) defines a fluid path 1624b (e.g., an outlet fluid flow path) connected to the fluid cavity 1620b. The fluid housing 1610 also defines a cavity 1626 that extends between the fluid cavity 1620a and the 1620b. The fluid housing 1610 includes a fluid control conduit 1630 that defines a linear fluid flow path 1632 along a conduit axis 1634 (e.g., the major axis of the fluid control conduit 1630). The fluid control conduit 1630 has a conduit inlet 1640 and a conduit outlet 1642, and fluidically connects the fluid cavity 1620a and the fluid cavity 1620b, putting the fluid cavity 1620a in fluidic communication with the fluid cavity 1620b.

The flow conditioner 1650 has a body 1670 having an end 1651 that is distal from the conduit inlet 1640, and an end 1653 opposite the end 1651. The body 1670 (e.g., housing, shell) surrounds a central cavity 1672. The body 1670 includes a collection of apertures 1673 (e.g., bores, conduits) that fluidically connect the central cavity to the radially outer surface of the flow conditioner 1650.

In use, fluid flows in through the fluid port 1622a, where it flows along a fluid path 1624a. The fluid flow is redirected to flow along the linear fluid flow path 1632, which is non-parallel to the fluid path 1624a. Fluid flow exiting the fluid control conduit 1630 is re-directed to flow along the fluid path 1624b, which is also non-parallel to the fluid control conduit 1630.

The fluid control conduit 1630 has a predetermined flowable area 1636 and shape (e.g., square, tapered, and/or curved edges, parallel or tapered walls, to affect fluid flow behavior). In some implementations, the fluid housing 1610 can be used across many applications, and the fluid control conduit 1630 can be an interchangeable, specialized sub-component (e.g., an adapter) that can adapt the USFM system 1600 for particular fluid types, applications, and/or operational conditions.

A collection of fluid seals 1638 are arranged in sealing contact between the fluid control conduit 1630 and the fluid housing 1610. The fluid seals 1638 are configured to prevent fluid leakage flow in parallel with the flowable area 1636. In some embodiments, the fluid seals 1638 can dampen the propagation of vibrations between the fluid control conduit 1630 and the fluid housing 1610. In some embodiments, the fluid seals 1638 can modify an acoustic interface. For example, the fluid seals can buffer an acoustic impedance mismatch that might otherwise occur if the fluid control conduit 1630 were arranged in direct contact with the fluid housing 1610 (e.g., the fluid control conduit 1630 can float within the fluid housing 1610 upon the fluid seals 1638).

The fluid control conduit 1630 includes a contoured profile 1681 that includes a tubularly convergent portion 1660a having a predefined geometry proximal the conduit outlet 1642. The tubularly convergent portion 1660a is configured to partly restrict fluid flow along the linear fluid flow path 1632. The contoured profile 1681 of the fluid control conduit 1630 also includes a tubularly divergent portion 1660b having a predefined geometry proximal the conduit outlet 1642 and configured to partly expand fluid flow along the linear fluid flow path 1632.

In some embodiments, the internal bore and/or the outer surface of the fluid control conduit 1630 can be formed with geometrical features configured to reduce measurement errors induced by the propagation of higher mode harmonics of the measurement signal frequency. For example, undesired signal energy can be scattered and/or delayed by features such as knurling, dimples, threads, grooves, bumps, roughness or any other appropriate formation that can disperse, attenuate, or otherwise reduce the propagation of ultrasonic signals.

In some embodiments, the fluid control conduit 1630 can have a predetermined internal bore diameter-to-length ratio that is selected to reduce measurement errors induced by the propagation of higher mode harmonics of the measurement signal frequency. For example the fluid control conduit 1630 can be configured with a predetermined diameter and length to have a predetermined fundamental frequency, and that places the ultrasonic sensor modules 1202 at the pressure nodes of the fundamental frequency so they receive wave energy at the fundamental frequency wavelength.

In some implementations, use of the fluid control conduit 1630 as a modular flow body can allow for various manufacturing methods and feature types to be integrated easily into the design configuration, such as an integral axis symmetric inlet flow conditioner, and/or an integral axis symmetric outlet flow conditioner. In some embodiments, the fluid control conduit 1630 can be configured as a removable inner housing having a predefined geometry, to promote modularity and ease of serviceability and/or replacement.

The flow conditioner 1652 has a tubular body 1670 having an end 1657 that is distal from the conduit outlet 1642, and a longitudinal end 1655 opposite the end 1657. A conditioner outlet 1674 is arranged circumferentially about the tubular body 1670. The longitudinal end 1655 defines a conditioner inlet 1676 proximal the conduit outlet 1642. The end 1657 defines an impingement surface that is configured to redirect impinging fluid flow along the conduit axis 1634 radially away from the linear fluid flow path 1632 and toward the conditioner outlet 1674, as represented by arrows 1690. The impinging fluid flow impinges in a first direction along the conduit axis 1634, and is redirected in a second direction that is at least partly opposite the first direction. In the illustrated example, the tubular body 1670 defines a cavity 1678 that is configured to act as a hydraulic dam or hydraulic circulator jump. In the illustrated example, the cavity 1678 is defined with a concave shape that somewhat resembles a mushroom or umbrella, to create a cylindrically divergent, serpentine flow path that causes the flow along the linear fluid flow path 1632 to make a near or complete 180-degree turn before it exits the conditioner outlet 1674.

The fluid housing 1610 also defines an outlet conduit 1680 that defines the fluid path 1624b. The outlet conduit 1680 is described in more detail in the descriptions of FIGS. 17A-17B.

Figure 17A:
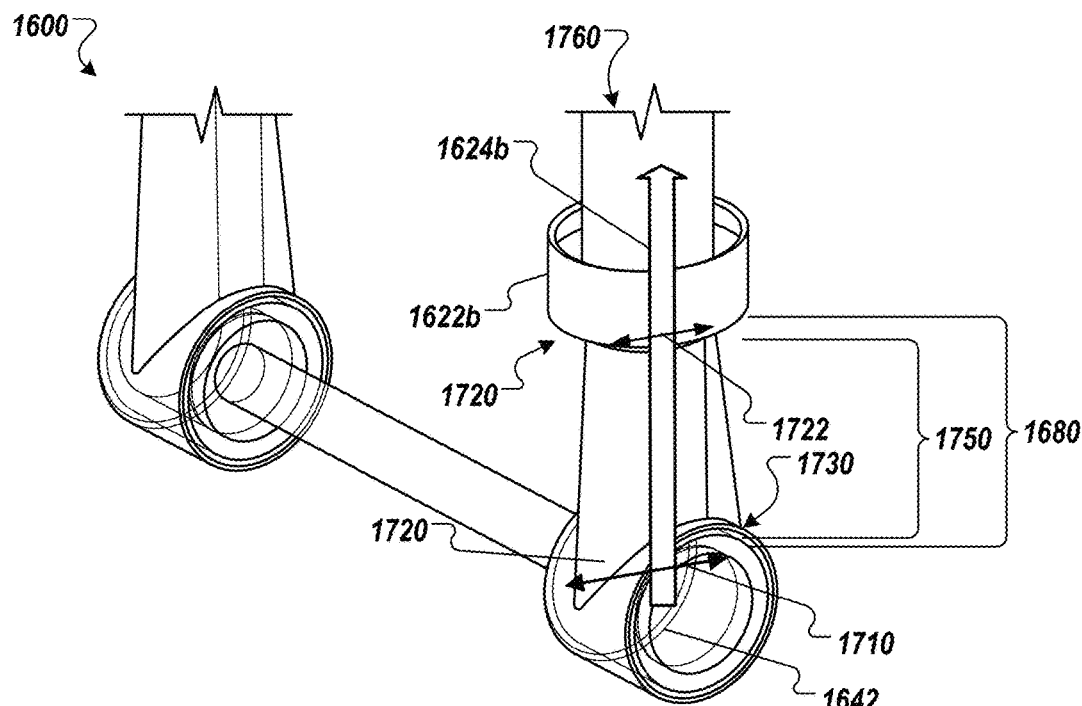
FIG. 17A is a perspective view of the example ultrasonic flow measurement system of FIG. 16.
Figure 17B:
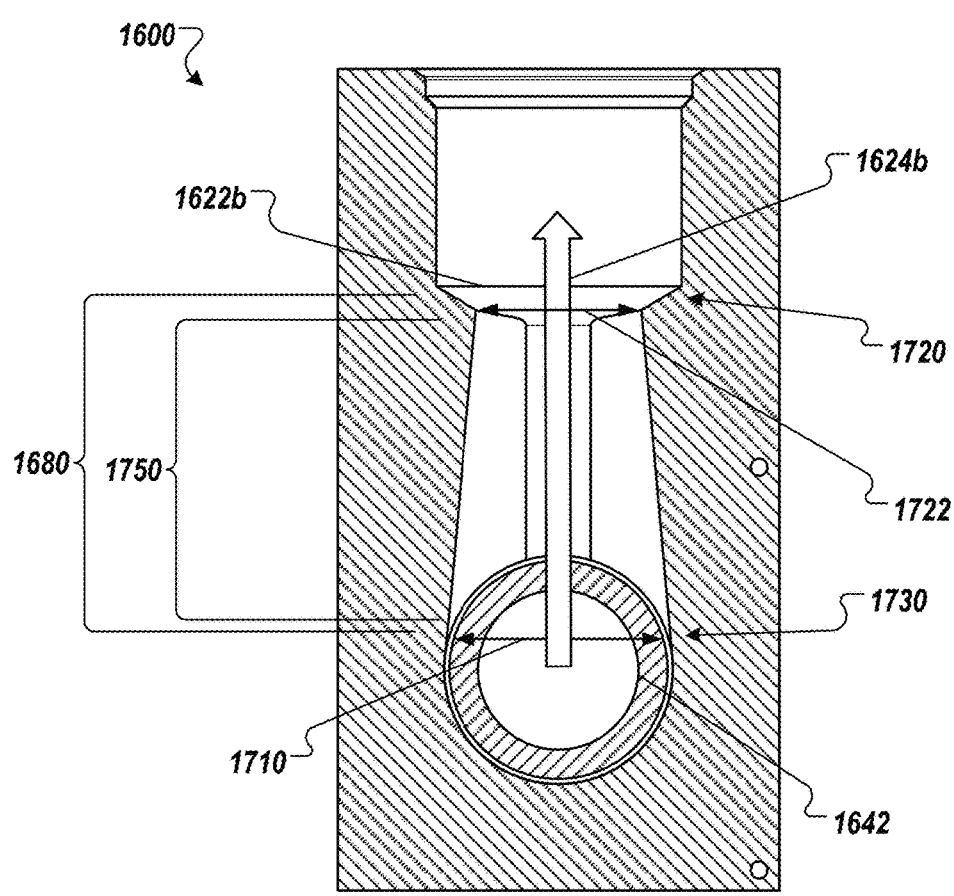
FIG. 17B is a sectional end view of the example ultrasonic flow measurement system of FIG. 16.

FIG. 17A is a perspective view of the example ultrasonic flow measurement system 1600 of FIG. 16. FIG. 17B is a sectional end view of the example ultrasonic flow measurement system 1600 of FIG. 16. In the illustrated examples, the outlet conduit 1680 has a flowable cross-sectional area 1710 perpendicular to the flow path 1624b. An outlet end 1720 is arranged proximal the fluid port 1622b and has a flowable cross-sectional area 1722 that is smaller than the flowable cross-sectional area 1710 perpendicular to the flow path 1624b. The outlet conduit 1642 has another outlet end 1730 opposite the outlet end 1720, and also has a tapered tubular conduit portion 1750 defining a cavity 1760 having the flowable cross-sectional area 1710 proximal the outlet end 1730 and tapering to the flowable cross-sectional area 1722 proximal the outlet end 1720.

Figure 18A:
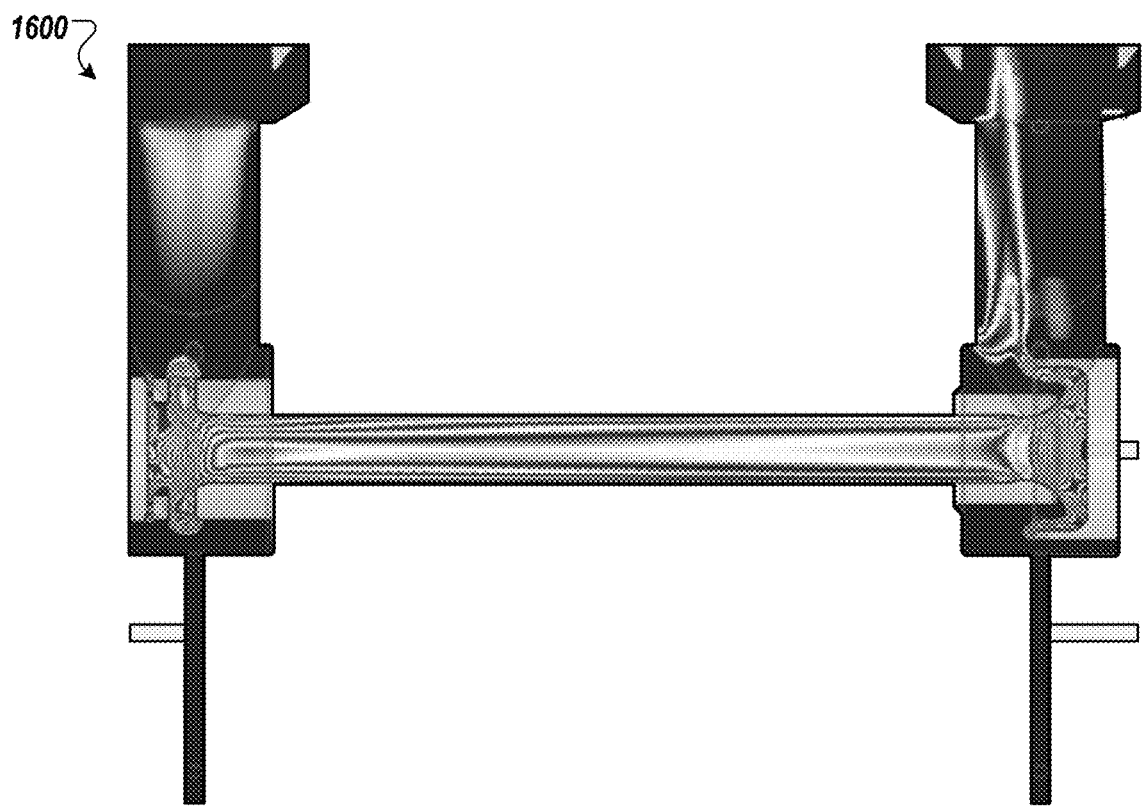
FIG. 18A shows a cross-sectional side view of an example computational fluid dynamics model of the example ultrasonic flow measurement system 1600 of FIGS. 16-17B (e.g., a z-plane section).
Figure 18B:
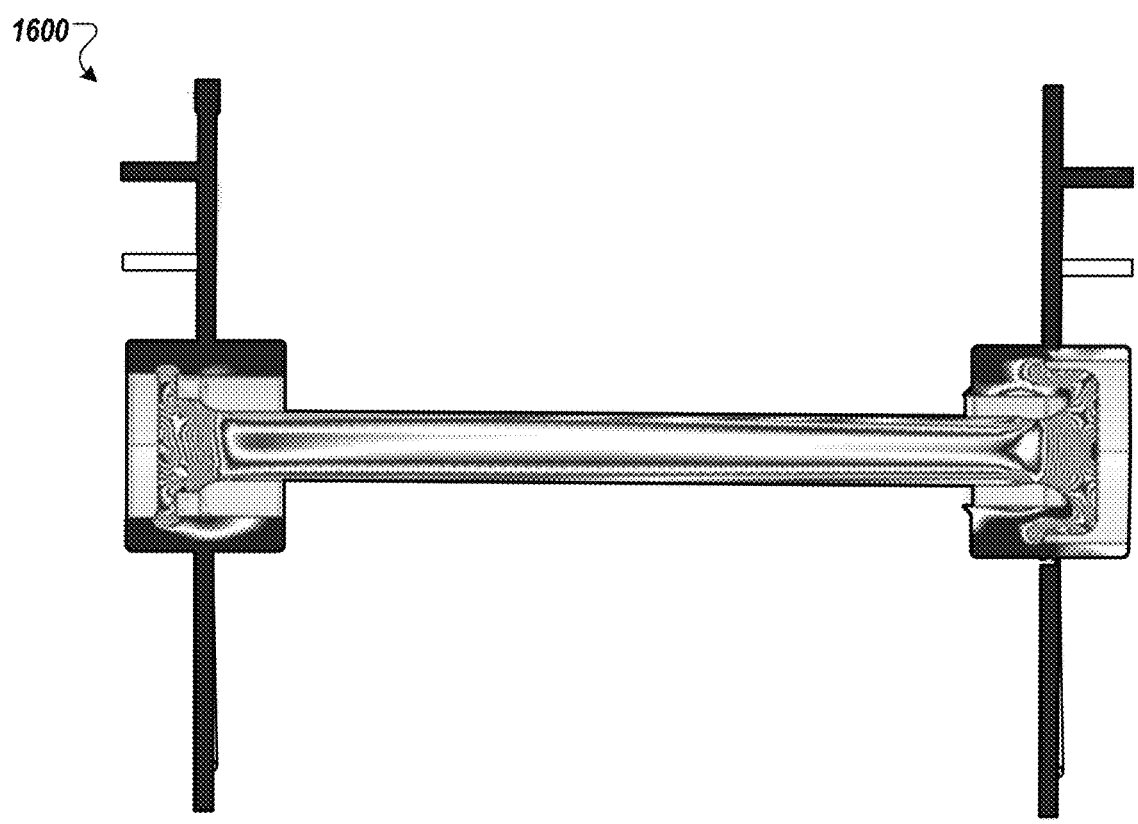
FIG. 18B shows a cross-sectional top view of the example computational fluid dynamics model of the example ultrasonic flow measurement system 1600.
Figure 18C:
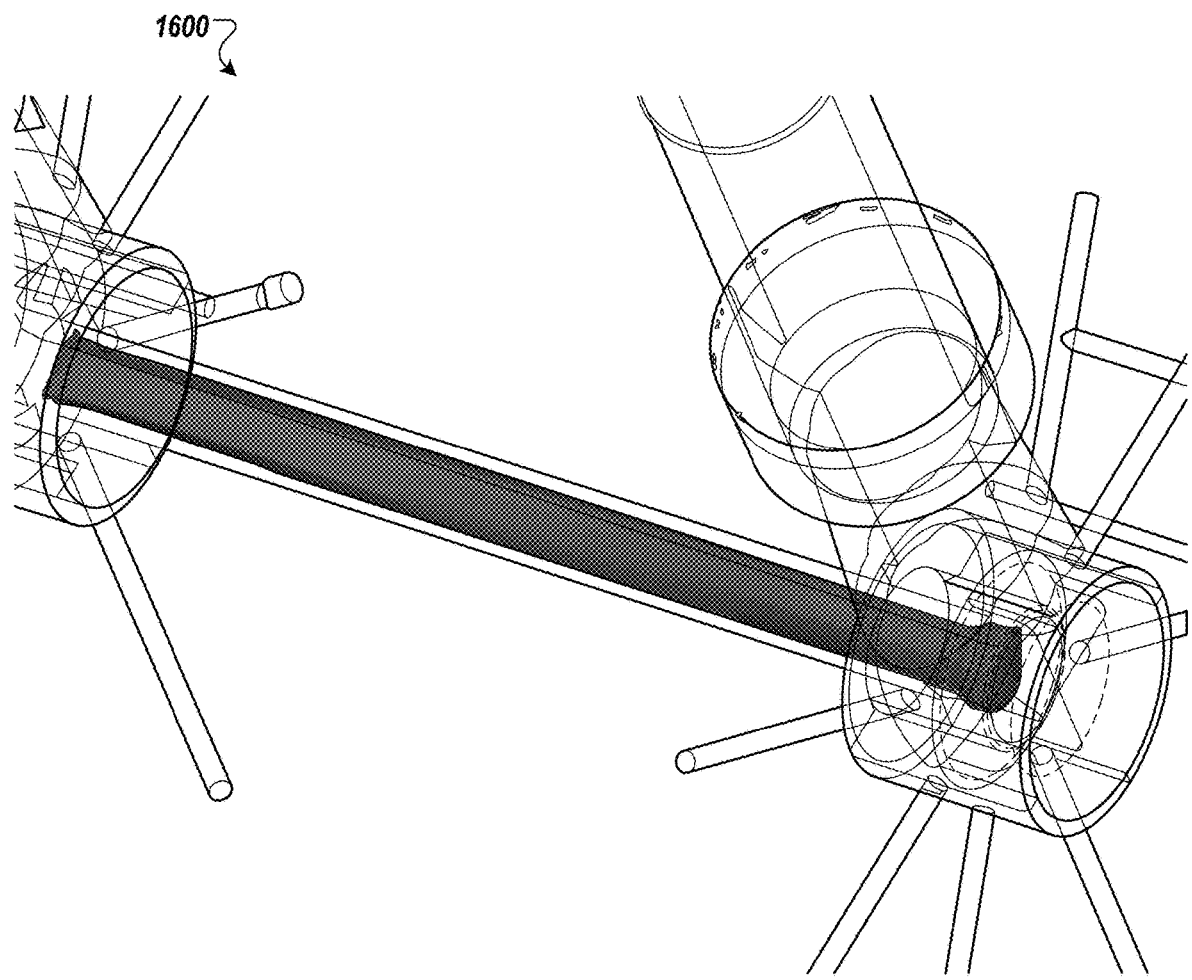
FIG. 18C shows a partial sectional isometric view of the example computational fluid dynamics model of the example ultrasonic flow measurement system of FIG. 16.

FIG. 18A shows a cross-sectional side view of the example computational fluid dynamics model of the example USFM system of FIG. 16. FIG. 18B shows a cross-sectional side view of the example computational fluid dynamics model of the example USFM system of FIG. 16. FIG. 18C shows a partial sectional isometric view of the example computational fluid dynamics model of the example USFM system of FIG. 16.

The flows are modeled based on a fluid flow velocity of 100 ft/sec. As shown in FIG. 18A-18C, the flows exhibit substantially improved conditioning. The example flow behaviors shown in FIGS. 18A-18C are at least partly attributable to the effects of the flow conditioners 1550 and 1652 upon fluid flow through the USFM system 1600.

A number of example flow conditioner configurations have been illustrated by and discussed in the descriptions of FIGS. 13A-18C. However, flow conditioner configurations are not limited to the illustrated examples. Flow conditioners having different diameters, lengths, shapes, central cavity configurations, aperture sizes, aperture shapes, aperture arrangements, materials, layerings, subconfigurations, and combinations of these any other appropriate flow-conditioning configuration can be used.

Figure 19:
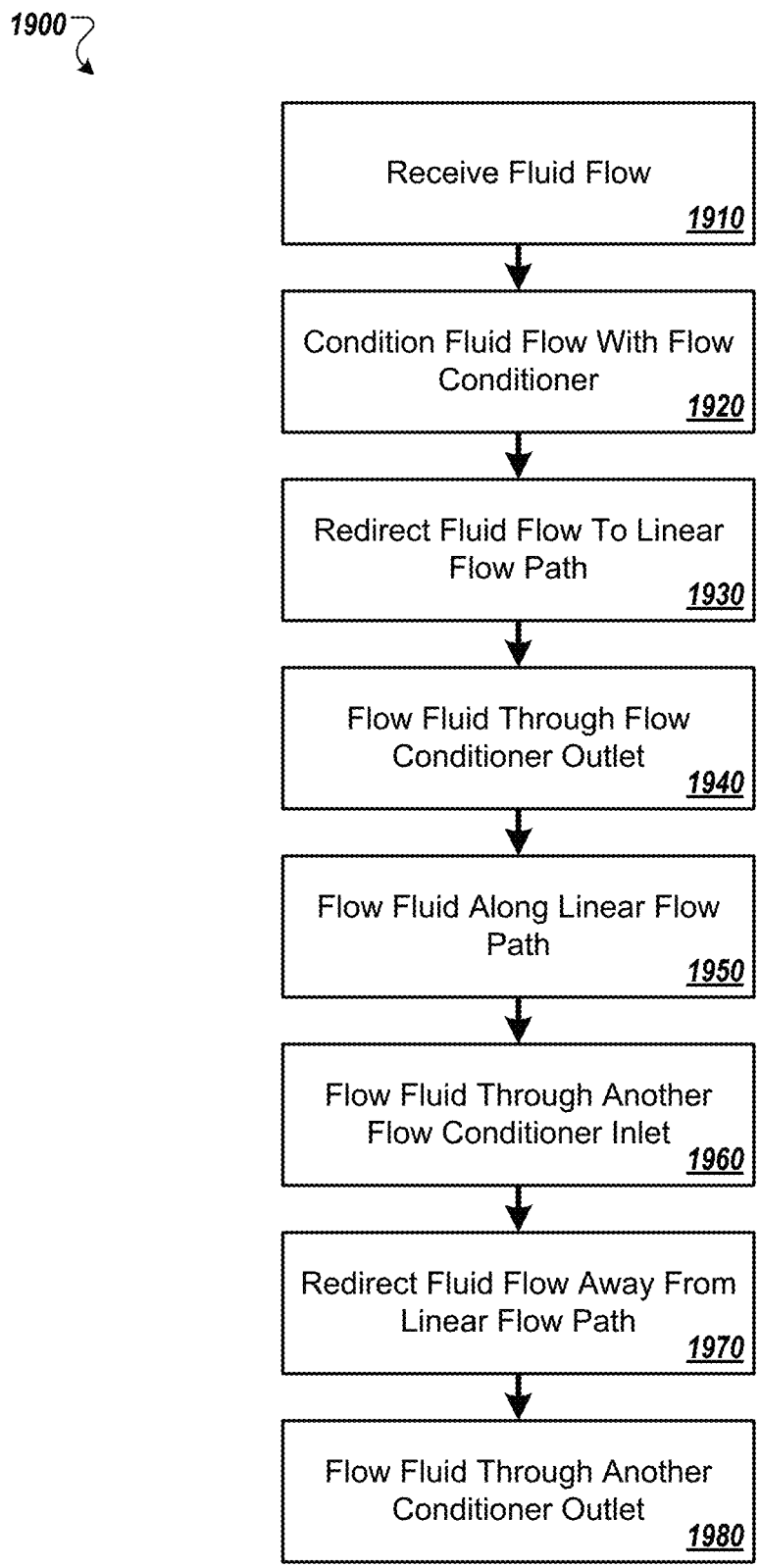
FIG. 19 is a flow chart that shows an example of a process for conditioning fluid flow in an example ultrasonic flow measurement system.

FIG. 19 is a flow chart that shows an example of a process 1900 for conditioning fluid flow in an example ultrasonic flow measurement system. In some implementations, the process 1900 can be used with any of the example USFM systems 1300, 1400, 1500, and 1600 of FIGS. 13A-18C, and any of the example flow conditioner configurations shown in FIGS. 13A-18C.

At 1910, a fluid flow, flowing along a first fluid flow path, is received. For example, fluid can flow into the USFM system 1600 through the fluid port 1622a along the fluid path 1624a.

At 1920, the fluid flow is conditioned by flowing the fluid flow through a first conditioner inlet of a first fluid flow conditioner. For example, the fluid flows from the fluid cavity 1620a, through the flow conditioner 1650, and to the conduit inlet 1640.

In some implementations, the first fluid flow conditioner can be a second tubular body extending between a first longitudinal end and a second longitudinal end opposite the first longitudinal end, where the first conditioner inlet can be arranged along the second tubular body, and the second longitudinal end can define the first conditioner outlet. For example, the flow conditioner 1650 has a body 1670 having an end 1651 that is distal from the conduit inlet 1640, and an end 1653 opposite the end 1651 and defines a fluid conditioner outlet.

In some implementations, the first conditioner inlet can include a collection of ports defined radially through the second tubular body, and conditioning fluid flow by flowing through a first conditioner inlet of a first fluid flow conditioner can include flowing the fluid flow through the collection of ports. For example, fluid can flow into the flow conditioner 1650 through the apertures 1673.

At 1930, the first fluid flow conditioner redirects the fluid flow away from the first fluid flow path and toward a linear fluid flow path. For example, the flow conditioner 1650 redirects the fluid flow away from the fluid path 1624a and toward the fluid path 1632. In the illustrated example, the redirection is approximately a 90-degree redirection, but in other examples the fluid flow conditioner may cause any other appropriate redirection of flow (e.g., 45 degrees, 60 degrees, 5 degrees, 85 degrees, 135 degrees, 150 degrees, 95 degrees, 175 degrees).

At 1940, fluid flow flows along the linear fluid flow path through a first conditioner outlet. For example, fluid can flow out through the end 1653 that defines the outlet of the flow conditioner 1650.

At 1950, the fluid flow flows along the linear fluid flow path through a fluid conduit having a first tubular body extending from a conduit inlet to a conduit outlet arranged opposite the conduit inlet, and configured with a predetermined flow geometry. For example, fluid can flow along the fluid control conduit 1630.

At 1960, the fluid flow flows through a second conditioner inlet of a second fluid flow conditioner along the linear fluid flow path. For example, fluid can flow from the conduit outlet 1642 through the end 1655.

At 1970, the fluid flow is redirected, by the second fluid flow conditioner, away from the linear fluid flow path and toward a second fluid flow path. For example the flow conditioner 1652 can redirect flow away from the fluid path 1632 and toward the fluid path 1624*b*.

In some implementations, redirecting, by the second fluid flow conditioner, the fluid flow away from the linear fluid flow path and toward a second fluid flow path can include flowing the fluid flow through a first longitudinal end of the second fluid flow conditioner, wherein the second fluid flow conditioner can include a second tubular body extending between the first longitudinal end defining the second conditioner inlet and a second longitudinal end opposite the first longitudinal end, impinging fluid flow along a major axis of the linear fluid conduit upon an impingement surface of the second longitudinal end, and redirecting the impinging fluid flow radially away from the linear fluid flow path and toward a second conditioner outlet arranged circumferentially about the second tubular body. For example, fluid exiting the conduit outlet 1642 can impinge upon and be redirected by the end 1657 and be redirected toward the conditioner outlet 1674.

In some implementations, the impinging fluid flow can impinge in a first direction along the major axis, and redirecting the impinging fluid flow can include redirecting the impinging fluid flow in a second direction at least partly opposite the first direction. For example, the flow along the conduit axis 1634 can be redirected by nearly 180 degrees by the end 1657 (e.g., as indicated by the arrows 1690).

At 1980, the fluid flow is conditioned by flowing the fluid flow through a second conditioner outlet of the second fluid flow conditioner. For example, fluid can flow through the flow conditioner 1652 toward the fluid port 1622*b*.

In some implementations, the second fluid flow conditioner can include a second tubular body extending between a first longitudinal end and a second longitudinal end opposite the first longitudinal end, where the second conditioner outlet is arranged along the second tubular body, and the second conditioner inlet is arranged proximal to the conduit outlet. For example, the flow conditioner 1652 has a body 1670 having an end 1657 that is distal from the conduit outlet 1642, and an end 1655 opposite the end 1657 and defines a fluid conditioner inlet.

In some implementations, the process 1900 can include partly restricting, by a tubularly convergent portion of the second fluid flow conditioner having a predefined geometry proximal the conduit outlet, fluid flow along the linear fluid flow path. In some implementations, the process 1900 can include partly expanding, by a tubularly divergent portion of the second fluid flow conditioner having a predefined geometry proximal the conduit outlet, fluid flow along the linear fluid flow path. For example, the USFM system 1600 includes the convergent portion 1660*a* and the divergent portion 1660*b*.

In some implementations, the process 1900 impinging fluid flow can impinge in a first direction along the major axis, and redirecting the impinging fluid flow can include redirecting the impinging fluid flow in a second direction at least partly opposite the first direction.

In some implementations, the process 1900 can also include transmitting an ultrasonic signal through the first conditioner outlet, the fluid conduit, and the second conditioner inlet along the linear fluid flow path, receiving the ultrasonic signal through the second conditioner inlet, and determining a mass flow rate and/or a volume flow rate of the fluid flow based on the received ultrasonic signal. For example the ultrasonic sensor modules 1202 can transmit and receive ultrasonic signals directed along the fluid path 1632 and the conduit axis 1634.

In some implementations, the process 1900 can include at least one of transmitting and receiving, by an ultrasonic transducer, an ultrasonic signal through the first conditioner outlet and the fluid conduit along the linear fluid flow path, where the first fluid flow conditioner also includes the ultrasonic transducer arranged proximal to the first longitudinal end. For example, one of the ultrasonic sensor modules 1202 is arranged at the end 1651 of the flow conditioner 1650 such that transmitted signals are directed out the end 1653 and along the conduit axis 1634 (e.g., the signals are transmitted downstream relative to the flow of fluid).

In some implementations, the process 1900 can include at least one of transmitting and receiving, by an ultrasonic transducer, an ultrasonic signal through the second conditioner outlet and the fluid conduit along the linear fluid flow path, where the second fluid flow conditioner includes the ultrasonic transducer arranged proximal to the second longitudinal end. For example, one of the ultrasonic sensor modules 1202 is arranged at the end 1657 of the flow conditioner 1652 such that transmitted signals are directed out the end 1655 and along the conduit axis 1634 (e.g., the signals are transmitted upstream relative to the flow of fluid).

In some embodiments, such as aerospace-focused flow sensors, the flow meter designs may have to conform to limitations of size, weight, and performance (e.g., aircraft UFSMs may need to be compact, lightweight, and robust to challenging L/D configurations surrounding the primary element). The example USFM systems 1300, 1400, 1500, 1600 of FIGS. 13A-18C can provide advantages over known art in the field of ultrasonic flow meters, especially in the axial configuration. For example, the example USFM systems 1300, 1400, 1500, 1600 can be embodied as integral up and down stream flow conditioners (e.g., compact) that can reduce or eliminate the need for significant uninterrupted lengths of pipe up and down stream of the flow body, active flow conditioners followed by uninterrupted pipe length, streamline shaping features (e.g., venturi, sigmoid, log), can reduce or eliminate the need for smooth bended shaping of the flow meter. In some embodiments, other advantages of a modular flow body can be realized for improvements of a flow sensor, such as improved modularity/scalability, the specific flow range target can be achieved through adjustment in the flow body definition (e.g., if an application requires a slightly higher fuel flow range, the flow body internal diameter can be increased to align with the application needs without redesigning the entire flow sensor and/or without changing the transducers), Murphy proofing and clocking features, field-replaceable flow body, improved durability over time, an ability to replace the core not the entire housing, and/or an integral line-replaceable unit approach.

In some embodiments, the example USFM systems 1300, 1400, 1500, and 1600 can provide improved cavitation control and/or improved acoustic feature control. For example, an integral flow tube having an internal bore diameter to length ratio can be specifically chosen to reduce measurement errors induced by the propagation of higher mode harmonics of the measurement signal frequency. In another example, an integral flow tube having an internal bore with impressed geometrical features, such as knurling, dimples, threads, grooves, bumps, can be specifically chosen to reduce measurement errors induced by the propagation of higher mode harmonics of the measurement signal frequency, by scattering and/or delaying the undesired signal energy. In another example, an integral flow tube can be configured to have an internal bore with one or more layers or coatings of a material or materials having a specified thickness and acoustic properties of sound speed, density, and/or impedance relative to the flow tube material and/or other layers, each selected to reduce measurement errors induced by the propagation of higher mode harmonics of the measurement signal frequency, based on absorption and/or refraction of the undesired signal energy away from the acoustic measurement path. For example, the linear fluid conduit can be configured to dampen ultrasonic acoustic signals.

In some embodiments, the example USFM systems 1300, 1400, 1500, and 1600 can enable precision machining. For example, the modular construction of the example USFM systems 1300, 1400, 1500, and 1600 can promote improved hone, surface smoothness control, and/or feature shaping abilities of their component parts during manufacture.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A fluid flow conditioning apparatus, comprising:
   a linear fluid conduit having a first tubular body defining a major axis and extending from a conduit inlet to a conduit outlet arranged opposite the conduit inlet, and configured with a predetermined flow geometry to define a linear fluid flow path along the major axis;
   a fluid inlet defining an inlet fluid flow path that is non-parallel to the linear fluid flow path;
   a first fluid flow conditioner having a tubular body having a first longitudinal end defining an axial aperture, a first conditioner inlet comprising a plurality of ports defined radially therethrough in fluidic communication with the fluid inlet, and a first conditioner outlet in fluidic communication with the conduit inlet, and configured to:
      receive fluid flow through the first conditioner inlet along the inlet fluid flow path;
      condition, by the first conditioner inlet, fluid flow; and
      redirect conditioned fluid flow away from the inlet fluid flow path and through the first conditioner outlet along the linear fluid flow path along the major axis;
   an ultrasonic sensor arranged proximal to the first longitudinal end and closing the axial aperture at the first longitudinal end;
   a second fluid flow conditioner having a second conditioner inlet in fluidic communication with the conduit outlet, and a second conditioner outlet, and configured to:
      receive fluid flow from the linear fluid flow path along the major axis;
      redirect fluid flow away from the linear fluid flow path and through the second conditioner outlet along an outlet fluid flow path that is non-parallel to the linear fluid flow path; and
      condition, by the second conditioner outlet, fluid flow; and
   a fluid outlet configured to receive fluid flow from the second conditioner outlet;
      wherein the second fluid flow conditioner comprises:
         a tubularly convergent portion having a predefined geometry proximal the conduit outlet and configured to partly restrict fluid flow along the linear fluid flow path; and
         a tubularly divergent portion having a predefined geometry proximal the conduit outlet and configured to partly expand fluid flow along the linear fluid flow path.

2. The fluid flow conditioning apparatus of claim 1, wherein the first fluid flow conditioner comprises a second tubular body extending between a first longitudinal end and a second longitudinal end opposite the first longitudinal end, wherein the first conditioner inlet is arranged along the second tubular body, and the second longitudinal end defines the first conditioner outlet.

3. The fluid flow conditioning apparatus of claim 2, wherein the first conditioner inlet comprises a plurality of ports defined radially through the second tubular body.

4. The fluid flow conditioning apparatus of claim 2, further comprising a sensor apparatus arranged proximal to the second longitudinal end.

5. The fluid flow conditioning apparatus of claim 1, wherein the second fluid flow conditioner comprises a second tubular body extending between a first longitudinal end and a second longitudinal end opposite the first longitudinal end, wherein the second conditioner outlet is arranged circumferentially about the second tubular body, and the first longitudinal end defines the second conditioner inlet, and the second longitudinal end comprises an impingement surface configured to redirect impinging fluid flow along the major axis radially away from the linear fluid flow path and toward the second conditioner outlet.

6. The fluid flow conditioning apparatus of claim 5, wherein impinging fluid flow impinges in a first direction along the major axis, and redirecting impinging fluid flow comprises redirecting impinging fluid flow in a second direction at least partly opposite the first direction.

7. The fluid flow conditioning apparatus of claim 1, wherein the fluid outlet comprises:
   a first outlet end proximal the second conditioner outlet and having a first flowable cross-sectional area perpendicular to the outlet fluid flow path;
   a second outlet end opposite the first outlet end having a second flowable cross-sectional area smaller than the first flowable cross-sectional area; and
   a tapered tubular conduit portion defining a cavity having the first flowable cross-sectional area proximal the first outlet end and tapering inwardly to the second flowable cross-sectional area proximal the second outlet end.

8. A method of fluid flow conditioning, comprising:
receiving a fluid flow, flowing along a first fluid flow path;
conditioning the fluid flow by flowing the fluid flow through a plurality of ports defined radially through a first conditioner inlet of a first fluid flow conditioner having a tubular body having a first longitudinal end defining an axial aperture;
redirecting, by the first fluid flow conditioner, the fluid flow away from the first fluid flow path and toward a linear fluid flow path;
flowing the fluid flow along the linear fluid flow path through a first conditioner outlet;
flowing the fluid flow along the linear fluid flow path through a fluid conduit having a first tubular body extending from a conduit inlet to a conduit outlet arranged opposite the conduit inlet, and configured with a predetermined flow geometry;
flowing the fluid flow through a second conditioner inlet of a second fluid flow conditioner along the linear fluid flow path;
partly restricting, by a tubularly convergent portion of the second fluid flow conditioner having a predefined geometry proximal the conduit outlet, fluid flow along the linear fluid flow path;
partly expanding, by a tubularly divergent portion of the second fluid flow conditioner having a predefined geometry proximal the conduit outlet, fluid flow along the linear fluid flow path;
redirecting, by the second fluid flow conditioner, the fluid flow away from the linear fluid flow path and toward a second fluid flow path;
conditioning the fluid flow by flowing the fluid flow through a second conditioner outlet of the second fluid flow conditioner; and
transmitting, by an ultrasonic sensor arranged proximal to the first longitudinal end and closing the axial aperture at the first longitudinal end, an ultrasonic signal through the first conditioner outlet, the fluid conduit, and the second conditioner inlet along the linear fluid flow path.

9. The method of claim 8, further comprising:
receiving the ultrasonic signal through the second conditioner inlet; and
determining at least one of a mass flow rate and a volume flow rate of the fluid flow based on the received ultrasonic signal.

10. The method of claim 8, wherein the first fluid flow conditioner comprises a second tubular body extending between a first longitudinal end and a second longitudinal end opposite the first longitudinal end, wherein the first conditioner inlet is arranged along the second tubular body, and the second longitudinal end defines the first conditioner outlet.

11. The method of claim 10, wherein the first conditioner inlet comprises a plurality of ports defined radially through the second tubular body, and conditioning the fluid flow by flowing the fluid flow through a first conditioner inlet of a first fluid flow conditioner further comprises flowing the fluid flow through the plurality of ports.

12. The method of claim 10, further comprising receiving, by the ultrasonic sensor, the ultrasonic signal through the first conditioner outlet and the fluid conduit along the linear fluid flow path.

13. The method of claim 8, wherein redirecting, by the second fluid flow conditioner, the fluid flow away from the linear fluid flow path and toward a second fluid flow path comprises:
flowing the fluid flow through a first longitudinal end of the second fluid flow conditioner, wherein the second fluid flow conditioner comprises a second tubular body extending between the first longitudinal end defining the second conditioner inlet and a second longitudinal end opposite the first longitudinal end;
impinging fluid flow along a major axis of the fluid conduit upon an impingement surface of the second longitudinal end; and
redirecting the impinging fluid flow radially away from the linear fluid flow path and toward a second conditioner outlet arranged circumferentially about the second tubular body.

14. The method of claim 13, wherein the impinging fluid flow impinges in a first direction along the major axis, and redirecting the impinging fluid flow comprises redirecting the impinging fluid flow in a second direction at least partly opposite the first direction.

15. The method of claim 13, further comprising at least one of transmitting and receiving, by an ultrasonic transducer, an ultrasonic signal through the second conditioner outlet and the fluid conduit along the linear fluid flow path, wherein the second fluid flow conditioner further comprises the ultrasonic transducer arranged proximal to the second longitudinal end.

16. The method of claim 8, further comprising:
flowing the fluid flow from the second conditioner outlet of the second fluid flow conditioner along the second fluid flow path through a fluid outlet, wherein the fluid outlet comprises:
flowing the fluid flow through a first outlet end proximal the second conditioner outlet and having a first flowable cross-sectional area perpendicular to the second fluid flow path;
a second outlet end opposite the first outlet end; and
flowing the fluid flow from the first outlet end through a tapered tubular conduit portion defining a cavity having the first flowable cross-sectional area proximal the first outlet end and tapering inwardly to a second outlet end opposite the first outlet end and having a second flowable cross-sectional area, smaller than the first flowable cross-sectional area, proximal the second outlet end.

* * * * *